US010860986B2

(12) United States Patent
Suzuki

(10) Patent No.: US 10,860,986 B2
(45) Date of Patent: Dec. 8, 2020

(54) SCHEDULE MANAGEMENT APPARATUS

(71) Applicant: Toyota Jidosha Kabushiki Kaisha, Toyota (JP)

(72) Inventor: Koichi Suzuki, Miyoshi (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 149 days.

(21) Appl. No.: 15/646,474

(22) Filed: Jul. 11, 2017

(65) Prior Publication Data

US 2018/0018635 A1    Jan. 18, 2018

(30) Foreign Application Priority Data

Jul. 14, 2016   (JP) ................. 2016-139780

(51) Int. Cl.
| | |
|---|---|
| *G06Q 10/00* | (2012.01) |
| *G06Q 10/10* | (2012.01) |
| *H04W 4/029* | (2018.01) |
| *H04L 29/08* | (2006.01) |

(52) U.S. Cl.
CPC ........ *G06Q 10/1093* (2013.01); *H04W 4/029* (2018.02); *H04L 67/26* (2013.01)

(58) Field of Classification Search
None
See application file for complete search history.

(56) References Cited

U.S. PATENT DOCUMENTS

| | | | | |
|---|---|---|---|---|
| 7,149,533 B2* | 12/2006 | Laird | ............. | A61B 5/04 |
| | | | | 455/456.3 |
| 8,761,821 B2* | 6/2014 | Tibbitts | ............. | H04W 48/04 |
| | | | | 455/517 |
| 8,994,591 B2* | 3/2015 | Dupray | ............. | H04W 4/90 |
| | | | | 342/457 |
| 9,124,998 B2* | 9/2015 | Sasaki | ............. | H04W 4/00 |
| 9,172,738 B1* | 10/2015 | daCosta | ............. | G06Q 10/087 |
| 2004/0128066 A1 | 7/2004 | Kudo et al. | | |

(Continued)

FOREIGN PATENT DOCUMENTS

| | | |
|---|---|---|
| JP | 2004-045413 | 2/2004 |
| JP | 2008-040754 A | 2/2008 |

OTHER PUBLICATIONS

Aleaf, Abdul, Telematics Optimize the Human-Automotive Inteface, Feb. 25, 2006, EETimes, https://www.eetimes.com/telematics-optimize-the-human-automotive-interface/#, p. 1-9.*

*Primary Examiner* — Joseph M Waesco
(74) *Attorney, Agent, or Firm* — Dinsmore & Shohl LLP

(57) ABSTRACT

A schedule management apparatus includes a behavioral history generator to generate a behavioral history based on positions, movements, and visited places of the user; a first notifier to notify of a schedule to a terminal of the user; a behavior determiner to determine whether the user is heading for a destination after a departure time has passed, based on the behavioral history; a behavior predictor to predict a new destination based on the behavior history if the user is not heading for the destination; an arrival time estimator to estimate an arrival time at the destination or the new destination; a first schedule changer to change the destination and arrival time in the schedule to the new destination and arrival time; and a second notifier to notify of the schedule including the new destination and arrival time, to the terminal.

7 Claims, 18 Drawing Sheets

(56) References Cited

U.S. PATENT DOCUMENTS

| | | | | |
|---|---|---|---|---|
| 2013/0252591 A1* | 9/2013 | Sasaki | .................... | H04W 4/50 |
| | | | | 455/414.1 |
| 2013/0297551 A1* | 11/2013 | Smith | .................... | G06N 5/02 |
| | | | | 706/48 |
| 2013/0345961 A1* | 12/2013 | Leader | ............ | G01C 21/3617 |
| | | | | 701/410 |
| 2014/0187213 A1* | 7/2014 | Shuster | ............. | G06Q 10/1093 |
| | | | | 455/414.1 |
| 2014/0188541 A1* | 7/2014 | Goldsmith | ............ | H04L 67/306 |
| | | | | 705/7.19 |
| 2014/0278071 A1* | 9/2014 | San Filippo | ....... | G01C 21/3423 |
| | | | | 701/465 |
| 2014/0278086 A1* | 9/2014 | San Filippo | ....... | G01C 21/3492 |
| | | | | 701/527 |
| 2014/0372030 A1* | 12/2014 | Leader | ................... | G01C 21/20 |
| | | | | 701/526 |
| 2015/0031400 A1* | 1/2015 | Tian | .................... | H04W 4/023 |
| | | | | 455/456.3 |
| 2015/0045068 A1* | 2/2015 | Soffer | .................... | G01C 21/20 |
| | | | | 455/456.3 |
| 2015/0156606 A1* | 6/2015 | Shuster | ................ | H04W 56/00 |
| | | | | 455/414.3 |
| 2015/0205275 A1* | 7/2015 | Nakano | ............... | G06Q 10/109 |
| | | | | 700/275 |
| 2015/0278759 A1* | 10/2015 | Harris | .................. | H04W 4/024 |
| | | | | 705/338 |
| 2016/0162795 A1* | 6/2016 | Smith | .................. | H04W 4/029 |
| | | | | 706/12 |
| 2016/0255466 A1* | 9/2016 | Shuster | ................ | H04W 56/00 |
| | | | | 455/414.3 |
| 2016/0364823 A1* | 12/2016 | Cao | ....................... | G06Q 50/30 |
| 2017/0108348 A1* | 4/2017 | Hansen | .................. | H04W 4/44 |
| 2017/0238145 A1* | 8/2017 | Ferrell | .................... | H04L 51/20 |
| | | | | 455/456.3 |

* cited by examiner

FIG.4A

[RECOMMENDATION INFORMATION]
TIME TO GO HOME MAY BE SET EARLIER,
OR WOULD YOU LIKE TO STOP BY THE
FOLLOWING PLACES NEARBY TODAY?

(1) MOVIE THEATER
TITLE: "MOVIE_NAME"
TIME:
CONTENTS:
RESERVATION SITE:

(2) MUSEUM
TIME:
CONTENTS:

NO

SCHEDULE MANAGEMENT APPARATUS

CROSS-REFERENCE TO RELATED APPLICATIONS

This application is based upon and claims the benefit of priority of the prior Japanese Priority Application No. 2016-139780 filed on Jul. 14, 2016, the entire contents of which are hereby incorporated by reference.

FIELD

The present disclosure relates to a schedule management apparatus.

BACKGROUND

Conventionally, there has been a method for providing information that detects positional information of a vehicle, accumulates movement routes obtained from the detected positional information, and depending on an occurrence of an event such as starting the engine, predicts (or estimates) a place to go (a destination location) by referring to a movement route up to a present time and the accumulated movement route so as to provide a passenger of the vehicle with information of the predicted (or estimated) destination location (see, for example, Patent document 1).

RELATED-ART DOCUMENTS

Patent Documents

[Patent Document 1] Japanese Unexamined Patent Application Publication No. 2004-045413

However, such a conventional method for providing information cannot predict a destination location appropriately if the vehicle does not move as expected by the predicted schedule, and cannot estimate an arrival time at the destination location.

Also, if the conventional method for providing information is applied to a case where a user is not moving by vehicle, but moving in another way while carrying a terminal capable of detecting positional information, the method cannot predict and estimate a destination location and an arrival time appropriately if the user does not move as expected by the predicted schedule.

Thereupon, it is an object of an embodiment in the present disclosure to provide a schedule management apparatus that can predict and estimate a destination location and an arrival time appropriately.

SUMMARY

According to an embodiment, with respect to a schedule management apparatus to manage a schedule of a user that includes a schedule item including a departure location of a behavior of the user, a departure time at which the user leaves the departure location, a destination location of the behavior, and an arrival time at which the user arrives at the destination location, the schedule management apparatus includes a position obtainer configured to obtain a position of the user; a behavioral history generator configured to generate a behavioral history representing a history of the behaviors of the user, based on a history of the positions of the user up to a present time obtained by the position obtainer, a movement history representing a history of movements of the user obtained based on the history of the positions, and a history of places visited by the user obtained based on the movement history; a first notifier configured to issue a notification of the schedule item including the departure time, the departure location, the destination location, and the arrival time, to a terminal of the user; a behavior determiner configured to determine whether the user is heading for the destination location after the departure time has passed, based on the movement history starting from the departure location of the user; a behavior predictor configured to predict a new destination location, based on the movement history starting from the departure location and the behavioral history, in a case where the behavior determiner has determined that the user is not heading for the destination location; an arrival time estimator configured to estimate an arrival time at the new destination location in a case where the new destination location has been predicted; a first schedule changer configured, in the case where the new destination location has been predicted, to change the destination location and the arrival time included in the schedule item to the new destination location and the arrival time at the new destination location, respectively; and a second notifier configured to issue a notification of the schedule item changed by the first schedule changer including the new destination location and the arrival time at the new destination location, to the terminal of the user.

Since the schedule management apparatus in the embodiment generates a movement history from the history of positions of the user, it is possible to determine whether the user is heading for the destination location, based on the movement history starting from the departure location.

In addition, the schedule management apparatus generates the history of visited places from the movement history, and generates a behavioral history based on the history of the positions, the history of the movements, and the history of visited places.

Then, if the user is not heading for the destination location, the schedule management apparatus predicts a new destination location based on the behavioral history, estimates an arrival time at the new destination location, and transmits a notification of the schedule item including the new destination location and the predicted arrival time to the terminal of the user.

Therefore, even if the destination location has been changed, the schedule management apparatus can predict and estimate the destination location and the arrival time appropriately. Also, the schedule management apparatus can update the destination location and the arrival time of the schedule item appropriately, based on the behavioral history.

Also, the schedule management apparatus in another embodiment further includes a schedule generator configured to generate the schedule item including the departure time, the departure location, the destination location, and the arrival time, based on the behavioral history.

Therefore, even if the user does not generate the schedule item by him or herself, the user can obtain the schedule item generated based on his or her behavioral history.

Further, the schedule management apparatus in another embodiment further includes a deletion determiner configured to determine whether the schedule item including the destination location and the arrival time, or the schedule item including the new destination location and the arrival time at the new destination location, has been deleted; a free time interval determiner configured to determine, in a case where the deletion determiner has determined that the schedule item has been deleted, whether there is a free time interval in the schedule of the user after the arrival time or the arrival time at the new destination location; a recommendation information database configured to register recommendation information of a store or a facility fitting to a liking of the user; a recommendation provider configured to extract the recommendation information to be recommended to the user from the recommendation information database, based on the behavioral history, in a case where the free time interval determiner has determined that there is the free time interval; and a third notifier configured to issue a notification of the recommendation information presenting the store or the facility, to the terminal of the user.

In this way, the recommendation provider can extract recommendation information that has a high possibility of fitting to a liking of the user, based on the behavioral history. Therefore, if a free time interval has become available upon deletion of a schedule item, it is possible to provide recommendation information including a store or a facility fitting to a liking of the user, based on the behavioral history.

Further, in the schedule management apparatus in another embodiment, the arrival time estimator estimates the arrival time to the store or the facility presented in the recommendation information, in the case where the recommendation information has been extracted. The third notifier issues the notification of the recommendation information presenting the store or the facility, additionally presenting the arrival time to the store or the facility, to the terminal of the user.

Therefore, the user can know the arrival time at the destination location (a store or a facility fitting to a liking of the user) presented by the recommendation information on his or her terminal.

Further, in the schedule management apparatus in another embodiment, the third notifier issues the notification of the recommendation information presenting the store or facility and the arrival time to the store or the facility, to the terminal of the user, by a push notification.

Issuing a push notification in this way enables the user to obtain the content of the notification only by glancing at the display unit, without operating the terminal. Therefore, the content of the notification can be transferred to the user faster and more securely.

Further, the schedule management apparatus in another embodiment further includes an information obtainer configured to obtain traffic information including at least one of road traffic information and operational information; a delay estimator configured to predict whether arriving at the destination location will be delayed with respect to the arrival time, based on the traffic information obtained by the information obtainer; a second schedule changer configured to advance the departure time, in a case where the delay estimator has predicted before the departure time has passed that arriving at the destination location would be delayed with respect to the arrival time, so as to avoid the delay with respect to arriving at the destination location, or to delay the arrival time by an amount of the delay in a case where the delay estimator has predicted, after the departure time has passed, that arriving at the destination location would be delayed with respect to the arrival time.

Therefore, if a delay is expected for the arrival time based on traffic information, the schedule item is changed such that the departure time is advanced or the arrival time is delayed.

Also, in the schedule management apparatus in another embodiment, the first notifier issues a notification of the advanced departure time to the terminal of the user by a push notification.

Issuing a push notification in this way enables the user to obtain the content of the notification only by glancing at the display unit, without operating the terminal. Therefore, the content of the notification can be transferred to the user faster and more securely.

Thus, it is possible to provide a schedule management apparatus that can predict and estimate a destination location and an arrival time appropriately.

BRIEF DESCRIPTION OF DRAWINGS

FIG. 4A is a diagram illustrating an example of a function of a schedule management apparatus 100;

DESCRIPTION OF EMBODIMENTS

In the following, embodiments will be described to which a schedule management apparatus is applied.

EMBODIMENTS

Figure 1:
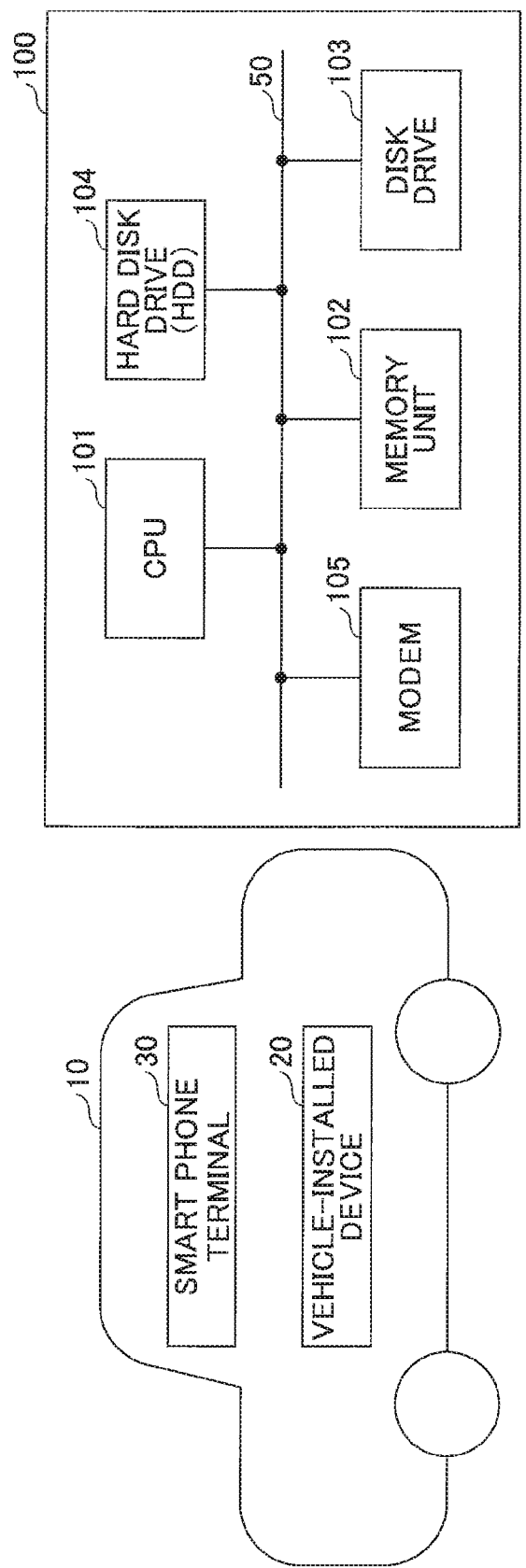
FIG. 1 is a diagram illustrating a vehicle 10 and a schedule management apparatus 100.

FIG. 1 is a diagram illustrating a vehicle 10 and a schedule management apparatus 100.

The vehicle 10 is, for example, an HV (Hybrid Vehicle), a PHV (Plug-in Hybrid Vehicle), an EV (Electric Vehicle), a gasoline-powered vehicle, or a diesel vehicle. The vehicle 10 has a vehicle-installed device 20 installed, and the user of the vehicle 10 has a smartphone terminal 30.

Here, a hardware configuration of the schedule management apparatus 100 will be described that may be implemented by a computer system such as a server; the vehicle-installed device 20 and the smartphone terminal 30 will be described later in detail using FIG. 2.

The schedule management apparatus 100 includes a CPU (Central Processing Unit) 101; a memory unit 102 including a RAM (Random Access Memory) and/or a ROM (Read-Only Memory); a disk drive 103 such as a CD-ROM (Compact Disc Read-Only Memory) and a DVD-ROM (Digital Video Disc Read-Only Memory); an HDD (Hard Disk Drive) 104; and a modem 105, which are connected by a bus 50. The schedule management apparatus 100 may further include a display such as a liquid crystal display monitor, a keyboard, a mouse, and the like.

A program that causes the server to execute functions of the schedule management apparatus 100 may be downloaded from another computer system via the disk drive 103 or the modem 105, to be input into the server to be compiled.

The schedule management apparatus 100 coordinates with the vehicle-installed device 20 and the smartphone terminal 30, and may change a schedule based on a behavioral history of the user.

Figure 2:
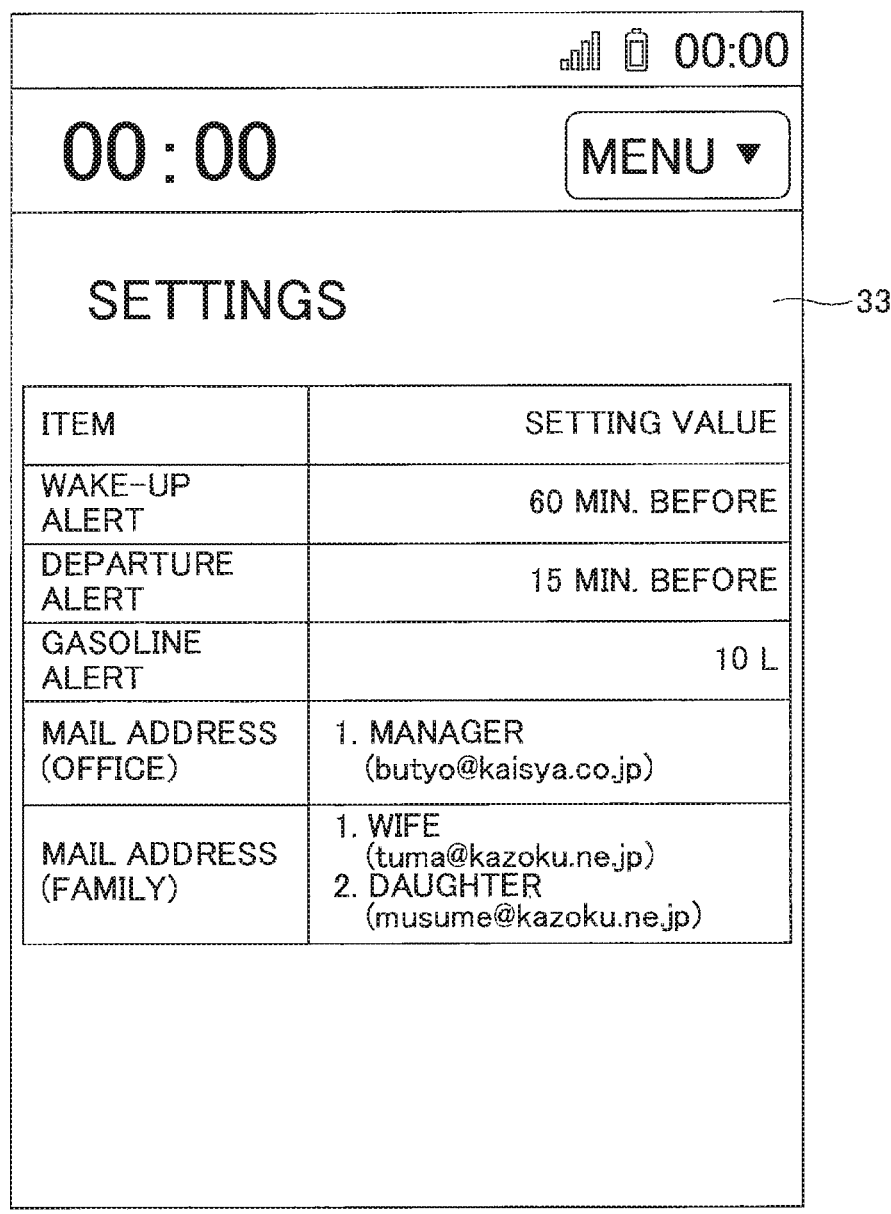
FIG. 2 is a diagram illustrating an example of items set on a schedule management apparatus 100.

FIG. 2 is a diagram illustrating an example of items set on the schedule management apparatus 100. FIG. 2 illustrates an image displayed on a display unit 33 of the smartphone terminal 30. The smartphone terminal 30 has an application for the schedule management apparatus 100 (scheduler) installed, and the image in FIG. 2 illustrates the items and contents to be input into the scheduler.

In FIG. 2, the illustrated items include a wake-up alert, a departure alert, a gasoline alert, an email address (office), and email addresses (family). The user inputs the content of each item on the smartphone terminal 30, and transmits the contents to the schedule management apparatus 100. The schedule management apparatus 100 transmits a command, a notification, or the like to the smartphone terminal 30, based on the contents of items received from the user. In the following, each of the items will be described.

The item of wake-up alert represents a time to issue an alert (warning) for waking up the user, and is set 60 minutes before the departure time. The departure alert represents a time to issue an alert before the departure time comes, and is set 15 minutes before the departure time. The gasoline alert is an alert to be issued when the amount of remaining gasoline decreases to a predetermined value, which is set to 10 L (liters).

If each item reaches the input (set) value, the schedule management apparatus 100 transmits a command to the smartphone terminal 30 so that the smartphone terminal 30 outputs a predetermined sound so that the alert is notified to the user. The alert is not be limited to the form of sound, but may be issued in various forms such as a push notification, vibration by a vibration generator, and the like.

The email address (office) represents an e-mail address of an office to which the communication unit 22 of the vehicle-installed device 20 transmits an e-mail automatically if the schedule management apparatus 100 has determined that the scheduled arrival time will be delayed. Here, an address of a manager (butyo@kaisha.co.jp) is set.

The email addresses (family) represent e-mail addresses of family members to which the communication unit 22 of the vehicle-installed device 20 transmits e-mails automatically if the schedule management apparatus 100 has determined that the scheduled arrival time will be delayed. Here, the addresses (tuma@kazoku.ne.jp and musume@kazoku.ne.jp) of the user's wife and daughter are set.

These addresses may be associated with one or more destination locations, to be set as destination addresses of an e-mail when a delay is expected. For example, if the destination location is the office and the schedule management apparatus 100 determines that the user is likely to miss a planned arrival time, the schedule management apparatus 100 transmits a command to the vehicle-installed device 20, and the communication unit 22 transmits an e-mail to the office automatically.

Also, when the destination location is set to the house or a place to meet a family member, if the schedule management apparatus 100 determines that the user is likely to miss a planned arrival time, the schedule management apparatus 100 transmits a command to the vehicle-installed device 20, and the communication unit 22 automatically transmits an e-mail to the house or the place to meet the family member. If the user has set in advance a member to meet (wife or daughter), the user can automatically transmit an e-mail to the member that is set in accordance with the meeting place, from the vehicle-installed device 20 if the user is likely to miss a planned meeting time. Note that although the embodiment described here assumes transmission by e-mail, the user may contact the member by using a social networking service instead of e-mail.

FIGS. 3A to 7B are diagrams illustrating examples of functions of the schedule management apparatus 100. Note that times described hereafter are represented in the 24-hour format.

Figure 3A:
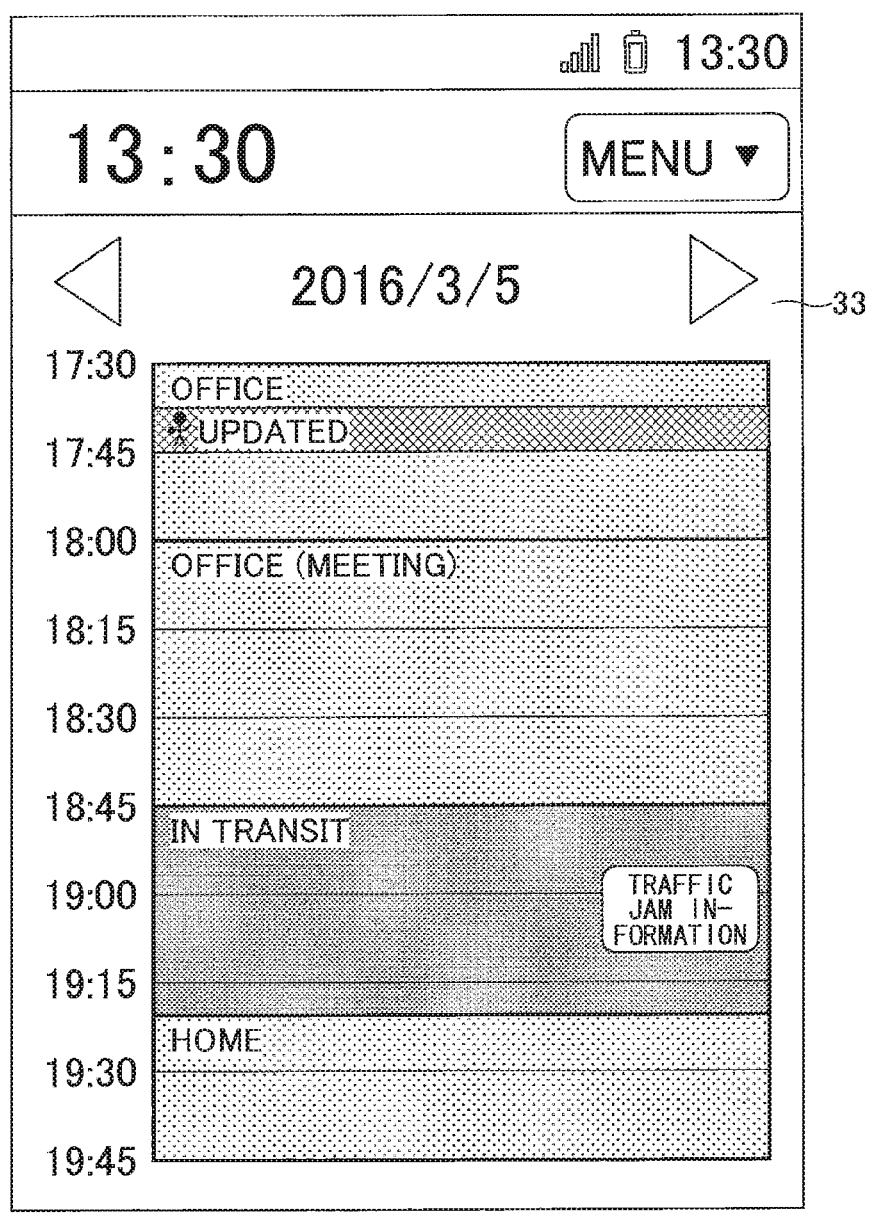
FIG. 3A is a diagram illustrating an example of a function of a schedule management apparatus 100.

Assume also that as illustrated in FIG. 3A, a schedule is planned as of 13:30 on Mar. 5, 2016, in which the user is to participate in a meeting at the office from 18:00 to 18:45 on that day, to leave the office at 18:45, and to come home at 19:20.

Figure 3B:
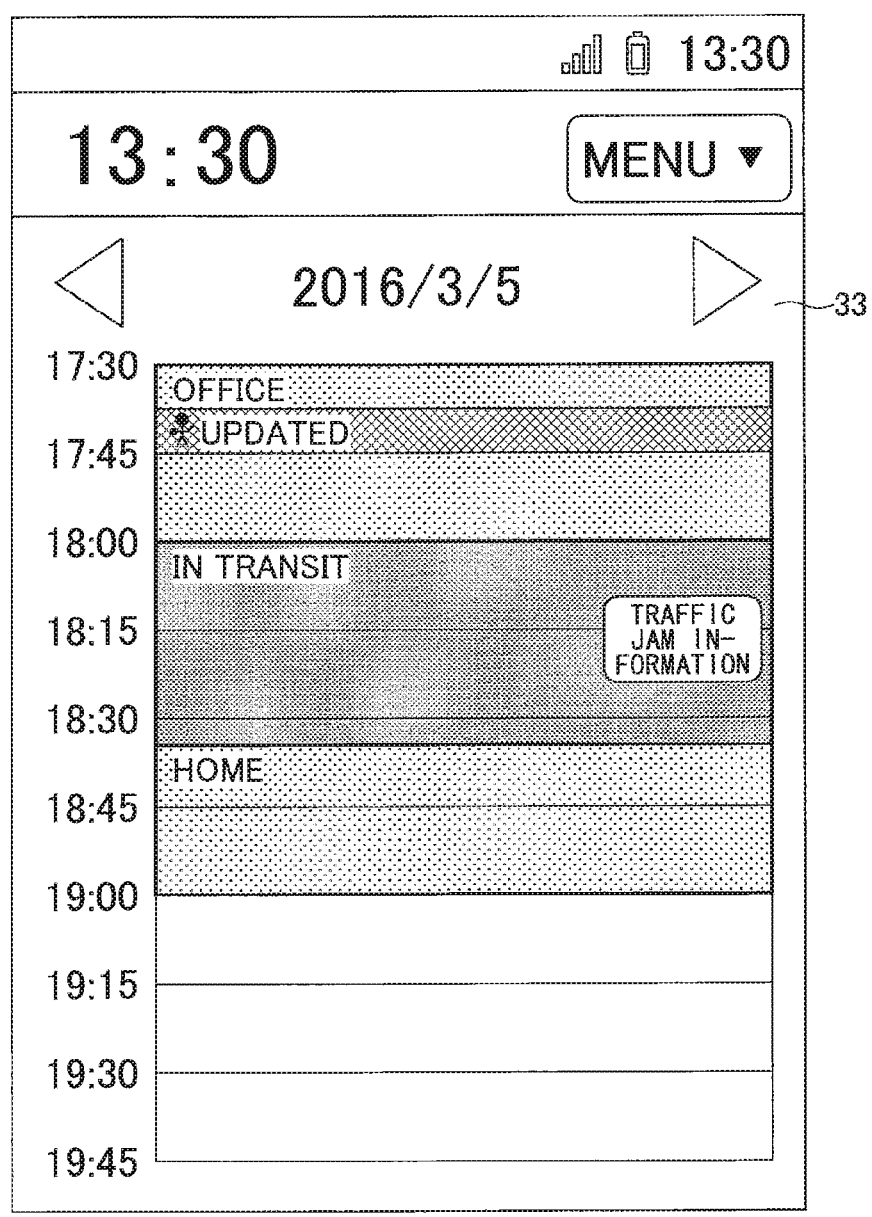
FIG. 3B is a diagram illustrating another example of a function of a schedule management apparatus 100.

In such a case, if the meeting is canceled, the user thereby deletes the schedule item of the meeting, then, the schedule is changed automatically as illustrated in FIG. 3B, in which the user is to leave the office at 18:00 and to come home at 18:35.

Also, if the schedule has been changed so that the time to come home is advanced as illustrated in FIG. 3B, recommendation information 33B is displayed on the display unit 33 of the smartphone terminal 30 by push notification as illustrated in FIG. 4A. The recommendation information 33B is extracted based on a behavioral history of the user.

The display unit 33 is omitted in FIG. 4A. In the recommendation information 33B by push notification, a show title running at a movie theater and contents of an exhibition at an art gallery are displayed, and the user is asked whether to "stop by" (make a visit).

Figure 4B:
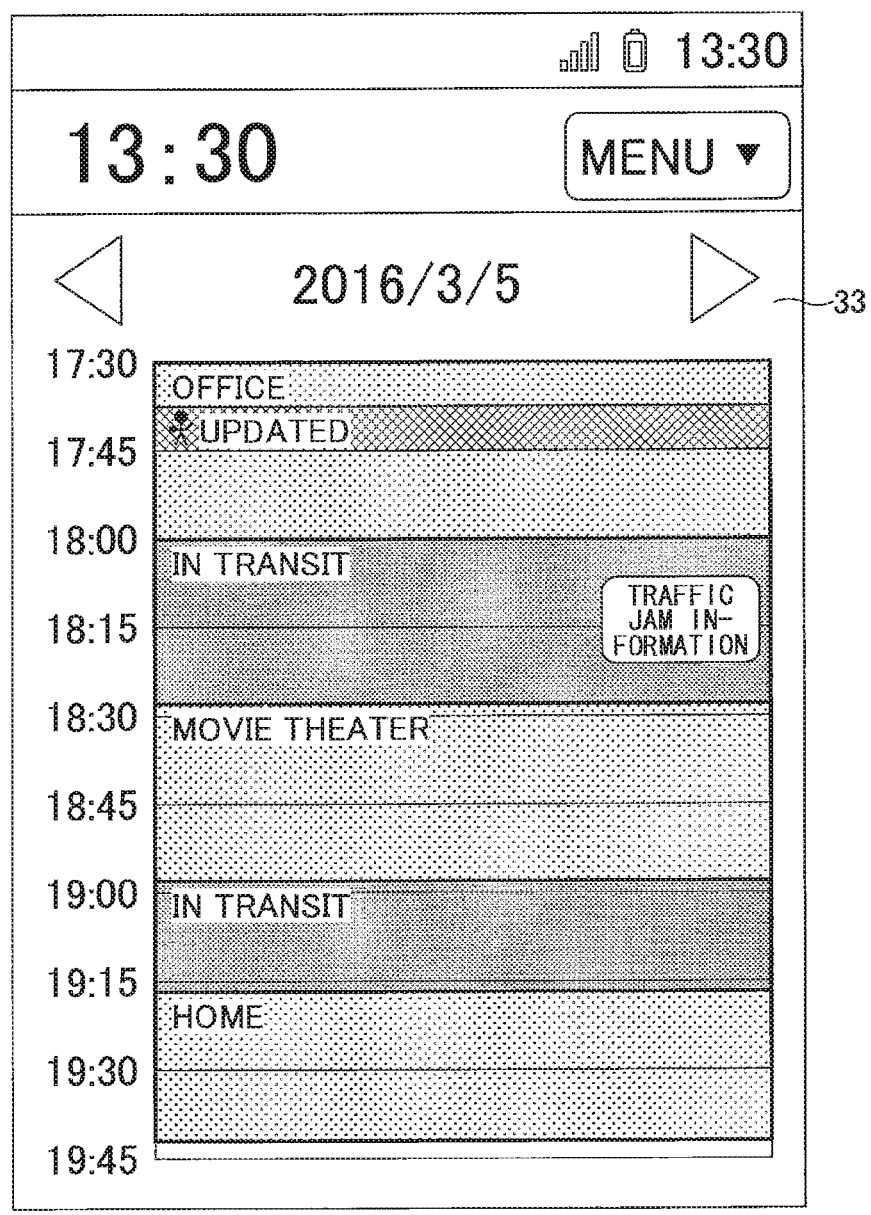
FIG. 4B is a diagram illustrating another example of a function of a schedule management apparatus 100.

As illustrated in FIG. 4B, if the user selects the movie, a schedule item of going to see the movie (18:25 to 18:55) is incorporated into the schedule. The departure time to the movie theater is set to 18:55, and the time to come home is changed to 19:20.

Figure 4C:
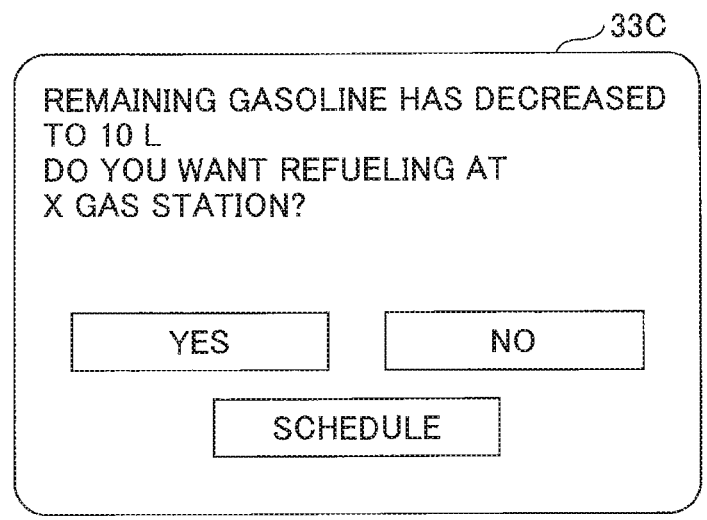
FIG. 4C is a diagram illustrating another example of a function of a schedule management apparatus 100.

Also, if the amount of remaining gasoline decreases to 10 liters, as illustrated in FIG. 4C, recommendation information 33C that proposes refueling at X GS (a gas station) is displayed on the display unit 33 of the smartphone terminal 30 by push notification. Refueling at X GS is extracted based on a behavioral history of the user. Note that in order to implement such a recommendation, the vehicle-installed device 20 may transmit the amount of remaining gasoline to the schedule management apparatus 100 periodically so that the schedule management apparatus 100 monitors the amount of remaining gasoline. Then, if the gasoline decreases to 10 liters, the vehicle-installed device 20 may transmit a command to the smartphone terminal 30 of the user to display the recommendation information 33C.

The display unit 33 is omitted in FIG. 4C. The recommendation information 33C by push notification displays buttons "YES" and "NO" to inquire whether to refuel. Note that a "SCHEDULE" button is a button to display the schedule.

Figure 4D:
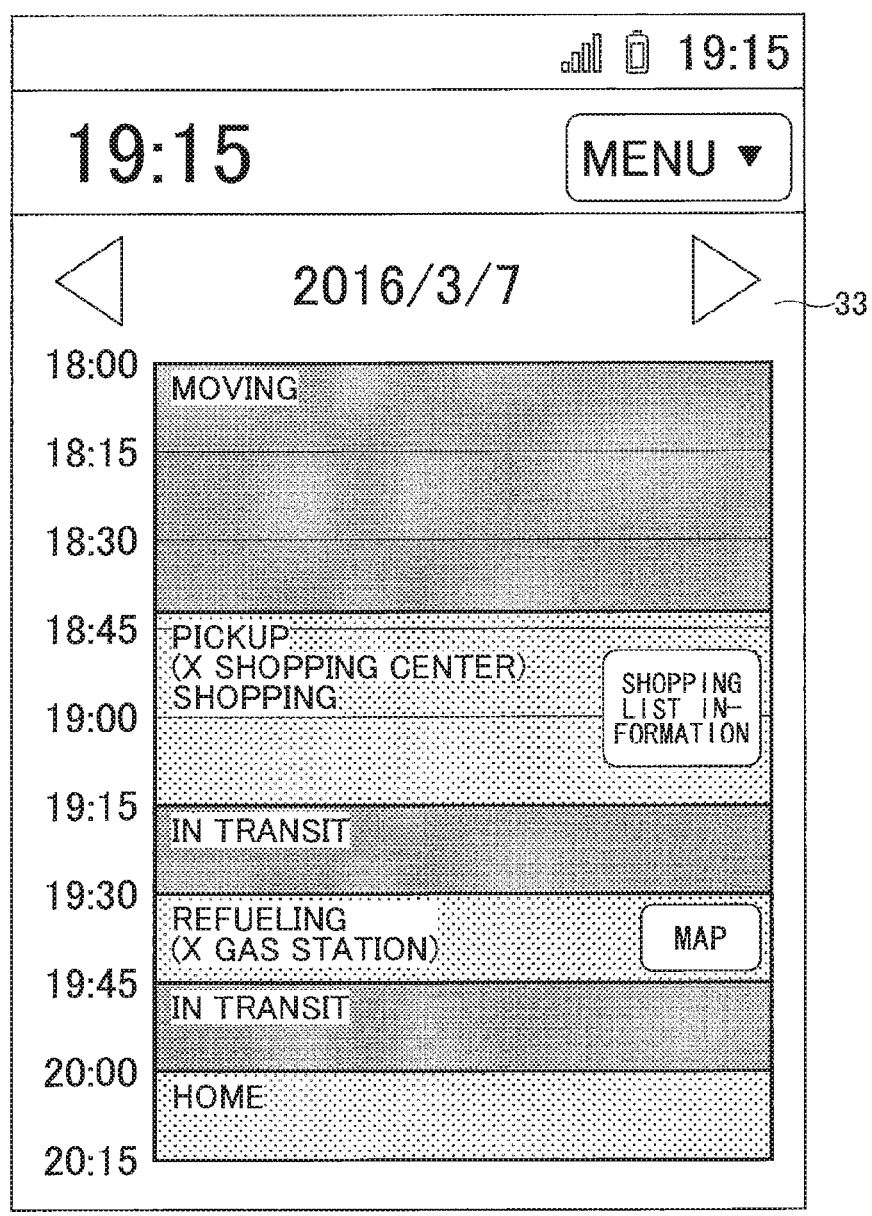
FIG. 4D is a diagram illustrating another example of a function of a schedule management apparatus 100.

If the user presses "YES" button for refueling, refueling (19:30 to 19:45) is incorporated into the schedule as illustrated in FIG. 4D. Note that unlike the schedule illustrated in FIG. 3A, the schedule illustrated in FIG. 4D is a schedule for Mar. 7, 2016, including picking up and shopping that have been set.

As described above, the schedule management apparatus 100 in the embodiment changes a schedule or recommends a new schedule based on a behavioral history of the user.

Next, contents illustrated in FIGS. 5A to 7B will be described. The contents are not directly changed based on a behavioral history of the user, but are incidental to the contents of schedule items that are changed based on a behavioral history of the user as in FIG. 3 and FIG. 4.

Figure 5A:
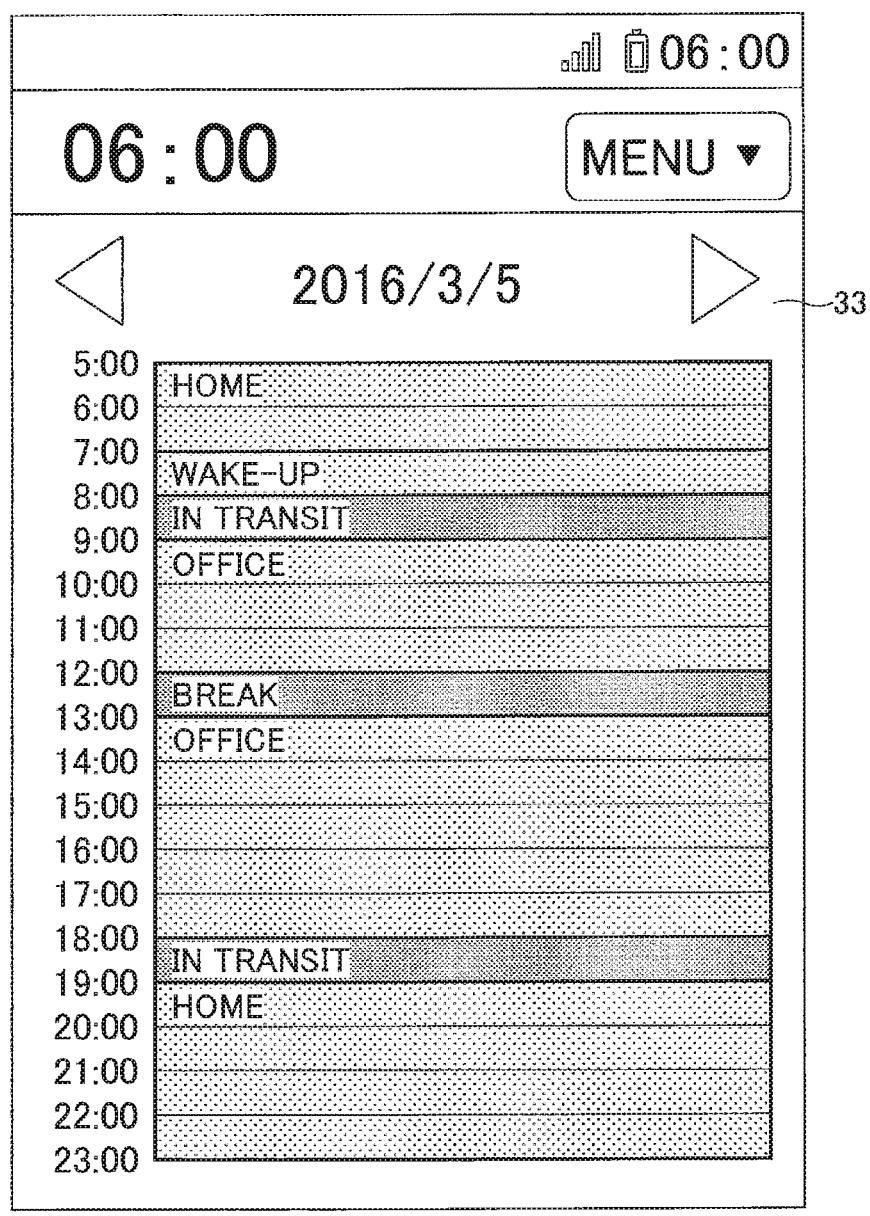
FIG. 5A is a diagram illustrating an example of a function of a schedule management apparatus 100.

As illustrated in FIG. 5A, the display unit 33 of the smartphone terminal 30 displays schedule items that have been registered in time series for a day (Mar. 5, 2016). Specifically, waking up is scheduled at 7:00. This is 60 minutes before the departure time (8:00) as illustrated in FIG. 2.

The departure time from the house is scheduled at 8:00 and the arrival time at the office is scheduled at 9:00. A break is scheduled for 12:00 to 13:00, the departure time to leave the office after work hours is scheduled at 18:00, and the arrival time at the house is scheduled at 19:00.

Here, assume that such a schedule has been set in advance, for example. Note that the schedule management apparatus 100 may generate such a schedule according to contents input by the user, or the schedule management apparatus 100 may automatically generate the schedule based on a behavioral history.

Figure 5B:
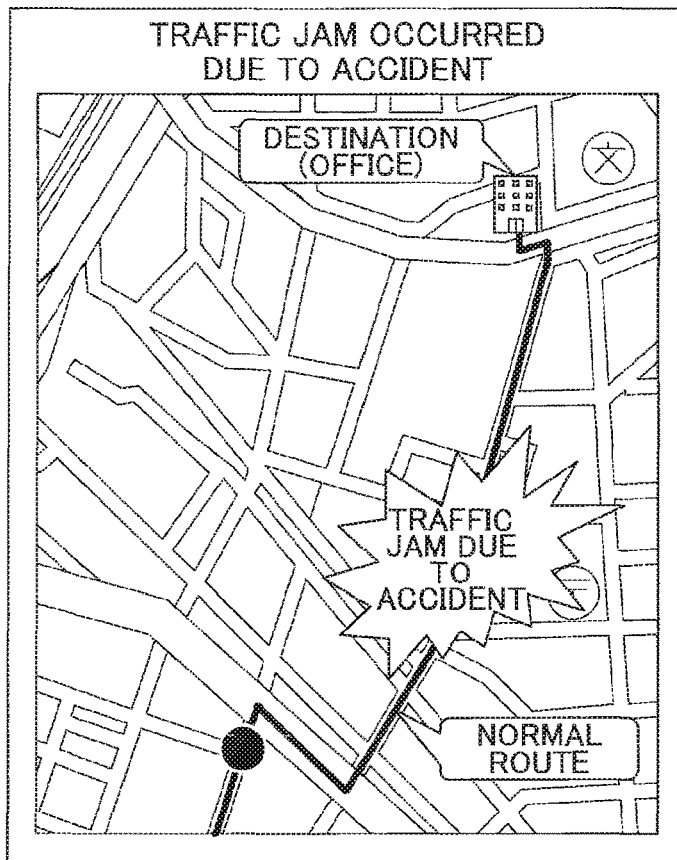
FIG. 5B is a diagram illustrating another example of a function of a schedule management apparatus 100.
Figure 5C:
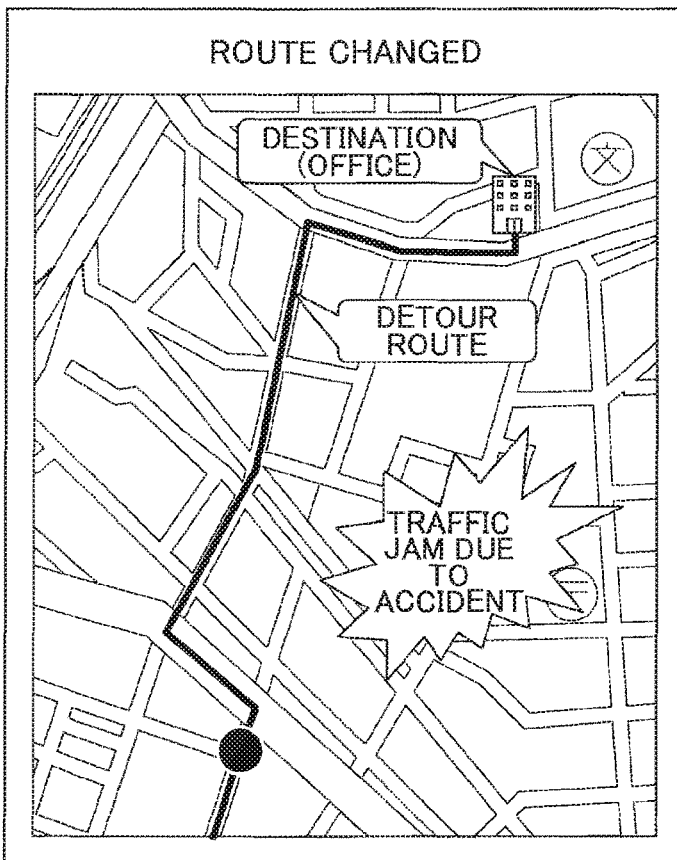
FIG. 5C is a diagram illustrating another example of a function of a schedule management apparatus 100.

Suppose that a traffic jam due to an accident has occurred in the morning of the day on a route connecting the house and the office as illustrated in FIG. 5B. In such a case, a detour route is extracted by a multi-modal route search function as illustrated in FIG. 5C.

Figure 6A:
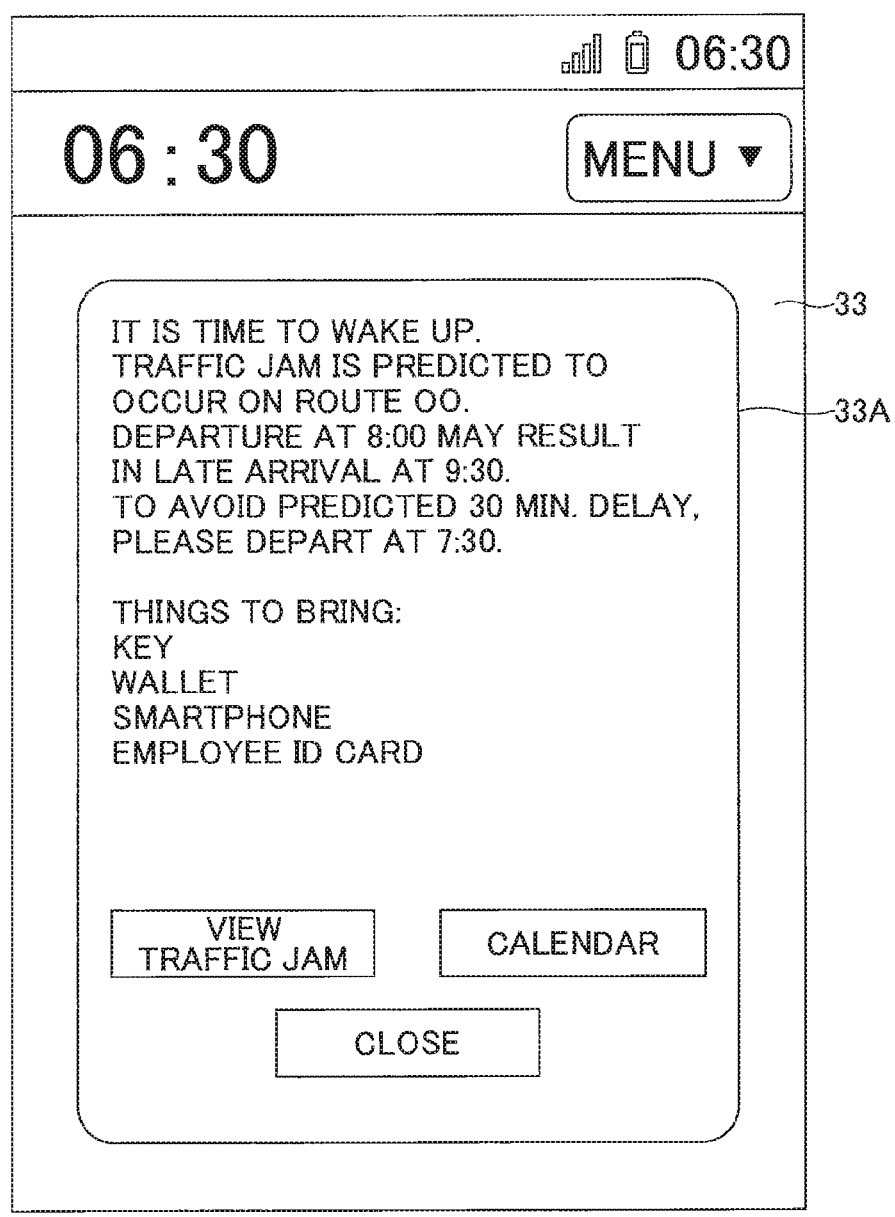
FIG. 6A is a diagram illustrating an example of a function of a schedule management apparatus 100.

Here, if the traffic jam due to the accident has occurred before leaving the house, for example, at 6:30, a message 33A by push notification is displayed on the display unit 33 of the smartphone terminal 30 as illustrated in FIG. 6A. The message 33A is to propose a 30-minute earlier departure at 7:30 because the traffic jam due to the accident makes the commuting time longer than it normally is, and the planned departure at 8:00 may result in a late arrival at 9:30.

Figure 6B:
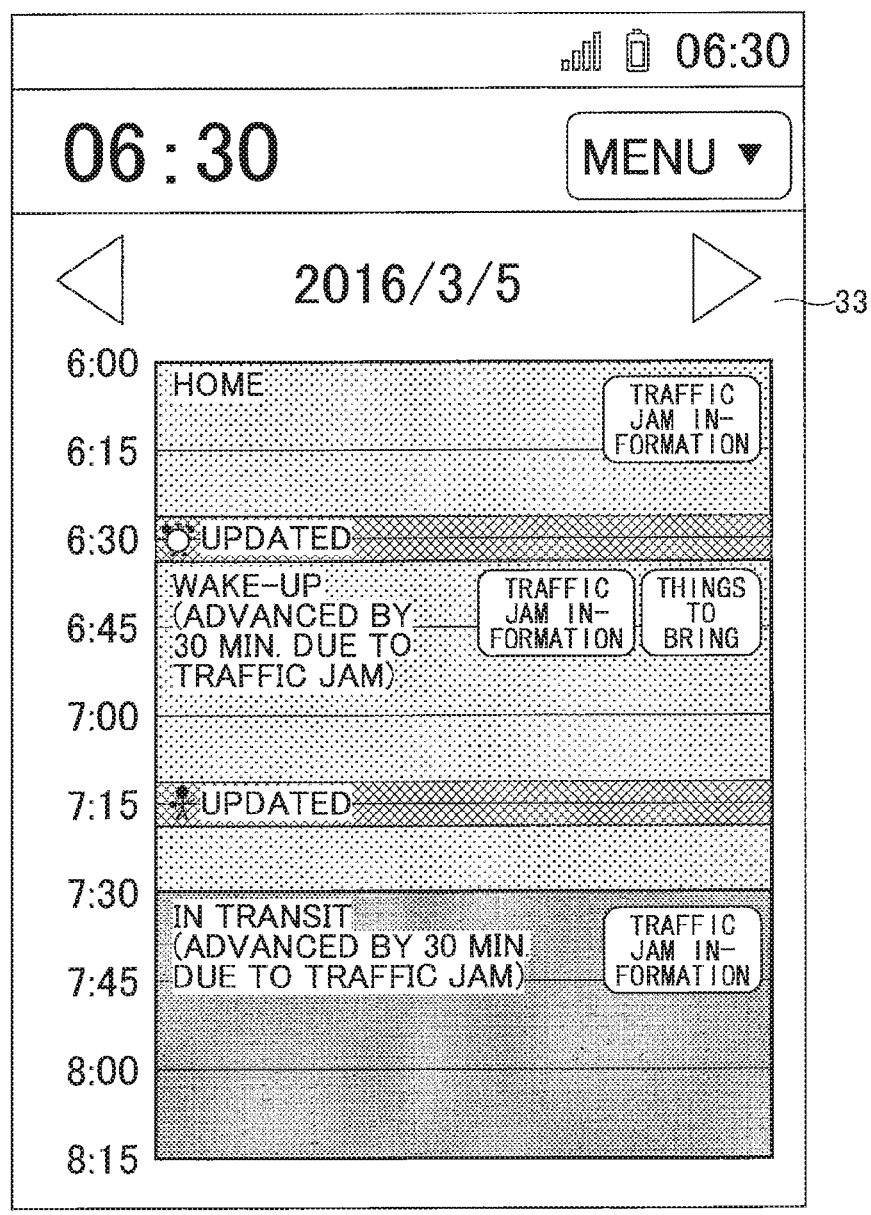
FIG. 6B is a diagram illustrating another example of a function of a schedule management apparatus 100.

As a result, the schedule is changed so that the wake-up time and the departure time are advanced by 30 minutes as illustrated in FIG. 6B.

Figure 7A:
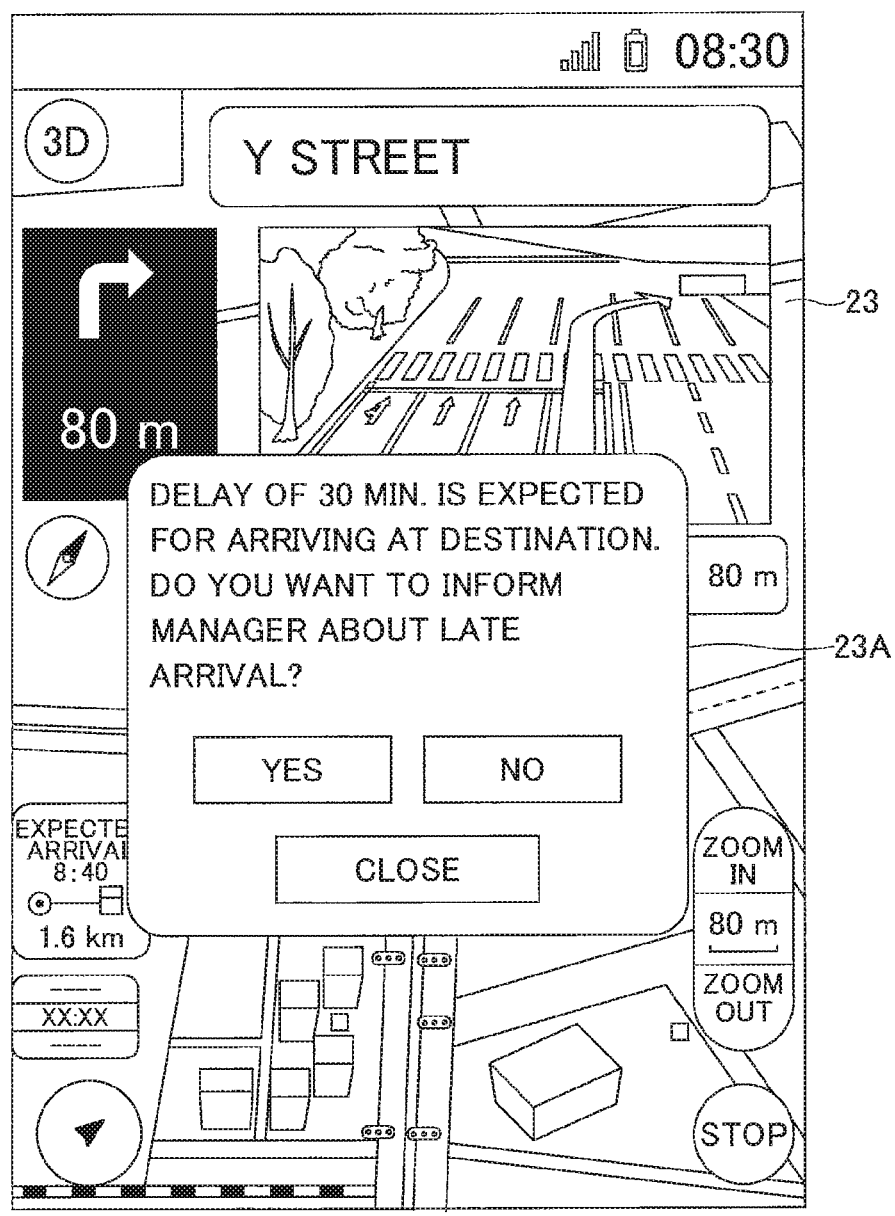
FIG. 7A is a diagram illustrating an example of a function of a schedule management apparatus 100.

If the traffic jam due to the accident has occurred after the departure from the house, for example, at 8:30, a message 23A by push notification is displayed on the display unit 23 of the vehicle-installed device 20 as illustrated in FIG. 7A. The message 23A is a message inquiring whether to transmit an e-mail to the manager about a 30-minute delay expected due to the traffic jam due to the accident. If the user presses the "YES" button, the vehicle-installed device 20 transmits the e-mail. If the user presses the "NO" button, the vehicle-installed device 20 does not transmit the e-mail.

Figure 7B:
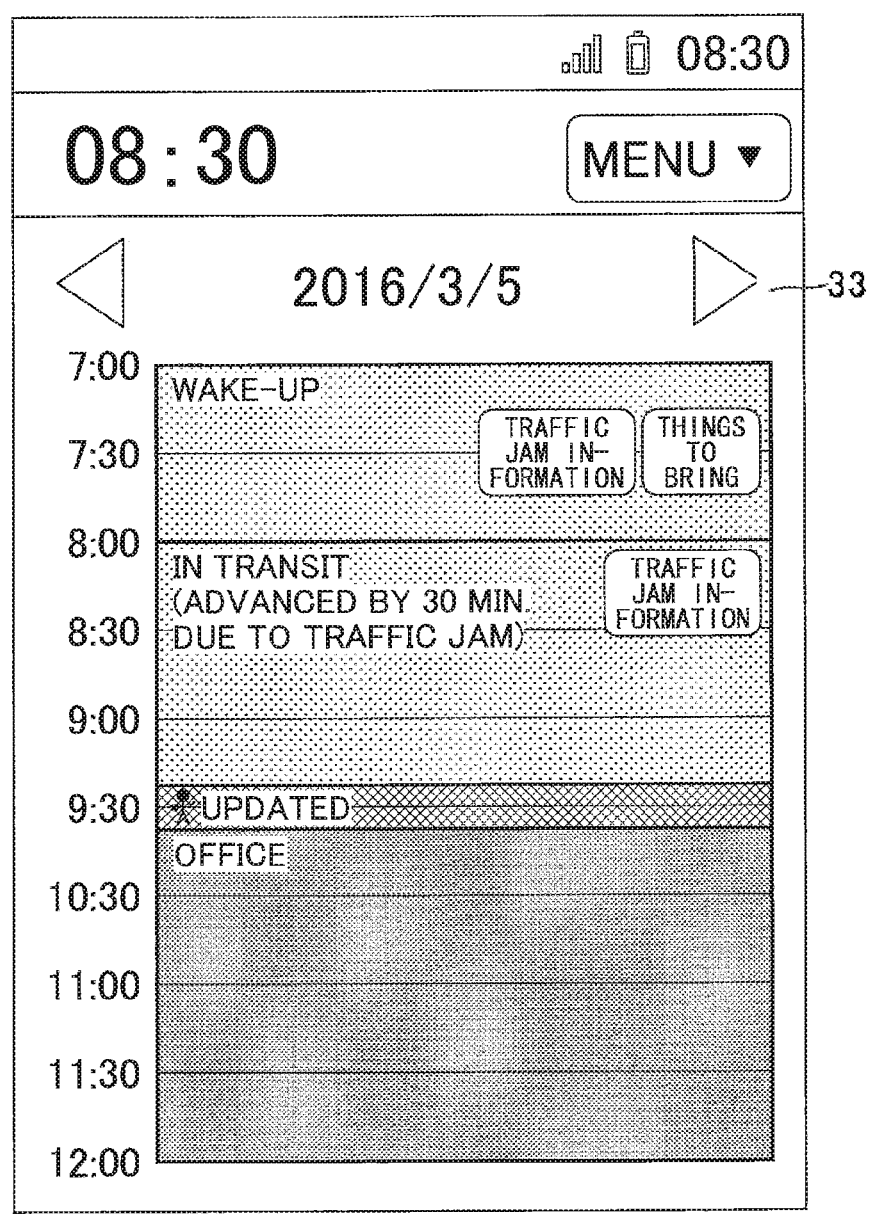
FIG. 7B is a diagram illustrating another example of a function of a schedule management apparatus 100.

Also, the schedule is changed so that the arrival time is delayed by 30 minutes as displayed on the smartphone terminal 30 in FIG. 7B.

As described above, the schedule may be changed or a new schedule may be recommended based on traffic information.

Figure 8:
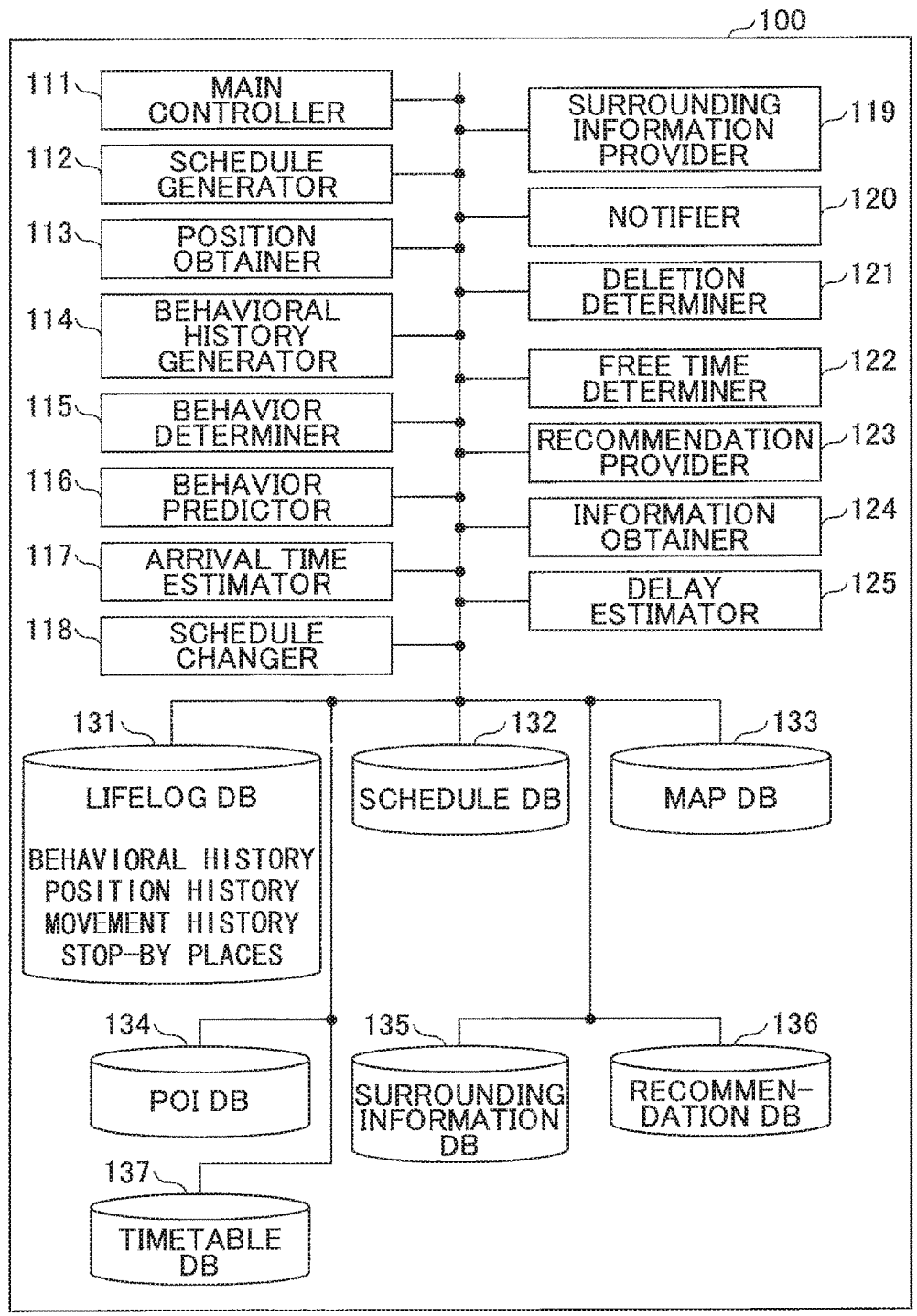
FIG. 8 is a diagram illustrating a functional configuration of a schedule management apparatus 100, a vehicle-installed device 20, and a smartphone terminal 30.
Figure 8:
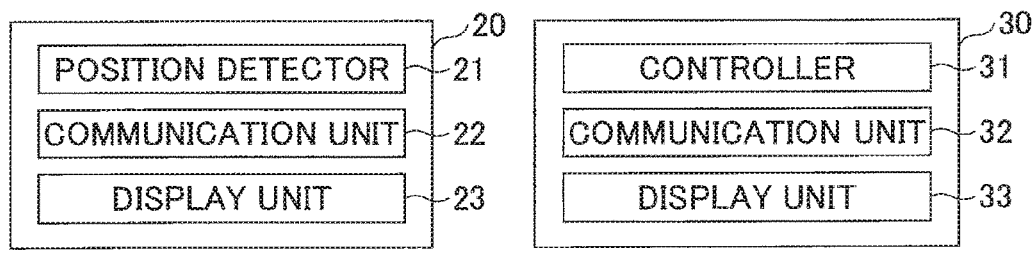

FIG. 8 is a diagram illustrating a functional configuration of the vehicle-installed device 20, the smartphone terminal 30, and the schedule management apparatus 100.

The vehicle-installed device 20 has a position detector 21, a communication unit 22, and a display unit 23.

The position detector 21 simply needs to be a device capable of detecting the position of the vehicle 10. The position detector 21 is, for example, a navigation device that detects the latitude and longitude of a present location of the vehicle 10, based on signals obtained from GPS (Global Positioning System) satellites, to output positional data representing the latitude and longitude of the present location. Also, the position detector 21 may further include a device capable of obtaining the altitude such as an atmospheric pressure sensor. In this case, the positional data may include information representing the altitude in addition to the latitude and longitude.

The communication unit 22 is a device to wirelessly communicate with the schedule management apparatus 100, which may be regarded as a DCM (Data Communication Module). The wireless communication is based on a communication scheme of, for example, 3G (Third Generation), 4G (Fourth Generation), or LTE (Long Term Evolution), and the communication unit 22 simply needs to be capable of communicating with the schedule management apparatus 100 by such a communication scheme even when the vehicle 10 is moving.

The communication unit 22 wirelessly communicates with the schedule management apparatus 100, and transmits positional data obtained by the position detector 21 to the schedule management apparatus 100. Also, the communication unit 22 receives data transmitted by the schedule management apparatus 100. Data to be received by the communication unit 22 from the schedule management apparatus 100 will be described later.

The display unit 23 is a display, for example, a liquid crystal panel or an organic EL (Electroluminescence) panel. The display unit 23 displays an image of a map, a present location of the vehicle 10 detected by the position detector 21, a destination location, and the like, and also displays the contents of data received by the communication unit 22.

The smartphone terminal 30 has a control unit 31, a communication unit 32, and the display unit 33. The control unit 31 is a part to execute a control process required for operating the smartphone terminal 30. The smartphone terminal 30 has a program that is installed for executing an application of the schedule management apparatus 100. The control unit 31 runs the program and makes the application of the schedule management apparatus 100 available on the smartphone terminal 30.

The communication unit 32 is a functional representation of a communication unit of the smartphone terminal 30. The communication unit 32 executes communication by a communication scheme, for example, 3G, 4G, or LTE. The display unit 33 is a display, for example, a liquid crystal panel or an organic EL (Electroluminescence) panel. The control unit 31 controls an image displayed on the display unit 33.

The schedule management apparatus 100 includes a main controller 111, a schedule generator 112, a position obtainer 113, a behavioral history generator 114, a behavior determiner 115, a behavior predictor 116, an arrival time estimator 117, a schedule changer 118, a surrounding information provider 119, and a notifier 120.

The schedule management apparatus 100 further includes a deletion determiner 121, a free time interval determiner 122, a recommendation provider 123, an information obtainer 124, and a delay estimator 125.

The schedule management apparatus 100 further includes a lifelog DB (Data Base) 131, a schedule DB 132, a map DB 133, a POI DB 134, a surrounding information DB 135, a recommendation DB 136, and a timetable DB 137.

The main controller 111, the schedule generator 112, the position obtainer 113, the behavioral history generator 114, the behavior determiner 115, the behavior predictor 116, the arrival time estimator 117, the schedule changer 118, the surrounding information provider 119, the notifier 120, the deletion determiner 121, the free time interval determiner 122, the recommendation provider 123, the information obtainer 124, and the delay estimator 125 are implemented by the CPU 101 illustrated in FIG. 1 running the program realizing the functions of the schedule management apparatus 100.

Also, the lifelog DB 131, the schedule DB 132, the map DB 133, the POI DB 134, the surrounding information DB 135, the recommendation DB 136, and the timetable DB 137 are stored in the memory unit 102 or the hard disk drive 104 illustrated in FIG. 1.

The main controller 111 is a control unit to supervise a control process of the schedule management apparatus 100. Also, the main controller 111 executes several processes that are different from those executed by the schedule generator 112, the position obtainer 113, the behavioral history generator 114, the behavior determiner 115, the behavior predictor 116, the arrival time estimator 117, the schedule changer 118, the surrounding information provider 119, the notifier 120, the deletion determiner 121, the free time interval determiner 122, the recommendation provider 123, the information obtainer 124, and the delay estimator 125.

The schedule generator 112 is used for generating a schedule item that includes a departure location, a departure time, a destination location, and an arrival time of a behavior of the user. When generating a schedule item, the user may input the departure location, the departure time, and the destination location into the application for the schedule management apparatus 100 (scheduler) installed in the smartphone terminal 30, and transmits the input data to the schedule management apparatus 100.

Upon receiving the data representing the departure location, the departure time, and the destination location from the smartphone terminal 30, the schedule generator 112 of the schedule management apparatus 100 causes the arrival time estimator 117 to calculate an arrival time based on the multi-modal route search function. Then, the schedule generator 112 generates a schedule item including the departure location, the departure time, the destination location, and the arrival time.

The schedule generator 112 registers the generated schedule item in the schedule DB 132. Multiple schedule items can be registered in the schedule DB 132. More specifically, multiple destination locations and corresponding departure locations, departure times, and arrival times included in the schedule items, respectively, can be registered in time series. Here, assume that a schedule item includes a single destination location and a corresponding departure location, a departure time, and an arrival time.

Here, an example will be described where the user inputs the departure location, the departure time, and the destination location into the smartphone terminal 30, and the schedule generator 112 of the schedule management apparatus 100 generates a schedule item.

However, the schedule generator 112 may automatically generate a future schedule item of the user, by extracting highly frequent behaviors in time slots from data items classified in terms of the month, date and time, category, and the like based on a behavioral history included in the lifelog DB 131, which will be described later, and applying a statistical process to the extracted behaviors. For example, if the user regularly goes to a sports club A away from home by about 2 km, at 10:00 every Sunday morning, the schedule generator 112 may automatically generate and incorporate a schedule item of going to the sports club A at 10:00 for the next Sunday into the schedule. Note that the category here is a type or an attribute of a facility or the like (e.g., transportation, meal, shopping, lodging, leisure, and sightseeing).

Also, the schedule generator 112 receives deletion of one or more schedule items or addition of one or more new schedule items. Deletion and addition of a schedule item can be performed by the user using the application for the schedule management apparatus 100 (scheduler) on the smartphone terminal 30.

The position obtainer 113 communicates with the vehicle-installed device 20, to obtain positional data. The positional data is data representing the latitude and longitude of a present location of the vehicle 10 detected by the position detector 21 implemented by a navigation device. The positional data detected by the position detector 21 is transmitted by the communication unit 22, to be received (obtained) by the position obtainer 113 of the schedule management apparatus 100.

The position obtainer 113 stores the obtained positional data in the lifelog DB 131 as an item of the positional history of the vehicle 10. The position obtainer 113 executes the process of obtaining the positional data in this way periodically (e.g., every one minute or every five minutes) so that the lifelog DB 131 accumulates the positional history representing a history of positions of the moving vehicle 10.

Note that the positional history is data that represents a history of positions of the vehicle 10 in time series obtained for a period starting from a certain past time up to the present, stored in the lifelog DB 131. Assuming that the positional data represents a position of the vehicle 10 by latitude and longitude, the positional history represents a history of positions of the vehicle 10 from a certain past time up to the present in time series by latitude and longitude.

The behavioral history generator 114 generates a behavioral history based on the positional history, the movement history, and stop-by places.

Here, the positional history is generated by the position obtainer 113 storing the positional data in the lifelog DB 131 as described above.

Also, the movement history represents a route of a movement (a movement route) of the vehicle 10 up to the present, and is obtained by applying map matching to a history of the latitudes and longitudes represented in the positional history, and associating the history with roads in map data. The movement history represents a history of roads and the like along the route included in map data, through which the vehicle 10 has moved. Note that map data required for generating a movement history is stored in the map DB 133.

Also, a stop-by place is represented by POI (Point Of Interest) information registered in the POI DB 134. The POI information represents names, types, and positions (latitudes and longitudes) of stores, facilities and the like along roads included in the map data.

The stop-by place is a place at which the user has visited (a visited place). In the movement history, a stop-by place is represented by a position at which the vehicle 10 stopped for a predetermined time (e.g., 10 minutes) or longer; or the name, type, or location (latitude and longitude) of a store, a facility, or the like represented in the POI information located close to the position.

This is because if the vehicle 10 stopped at a place for a predetermined time (e.g., 10 minutes) or longer, it is possible to consider that the user of the vehicle 10 made a visit to a store, a facility, or the like at the place. In this way, the stop-by places are generated based on the movement history and the map data (POI information).

The behavioral history generator 114 generates a behavioral history based on the positional history, the movement history, and the stop-by places as described above. The behavioral history is data representing a history of places visited by the user of vehicle 10 along with dates and times, and a route identified in the movement history. In other words, the behavioral history represents behaviors of the user as a history in terms of when and where the user has been and which route has been taken to reach the places by the vehicle 10.

The behavioral history also includes information representing a transit time for a section between positions specified by two positional history items. Therefore, the behavioral history retains behaviors (a route on which the vehicle 10 has traveled) from the departure location to the final destination location via the stop-by places, as a single record.

The behavior determiner 115 determines whether the vehicle 10 is heading for a destination location, based on the movement history. Using the movement history makes it possible to grasp the route of the vehicle 10 from the departure location. Therefore, the behavior determiner 115 determines whether the vehicle 10 is heading for the destination location by comparing the route of the vehicle 10 with a route to the destination location.

When comparing the routes, the behavior determiner 115 calculates a vector representing the route of the vehicle 10, and a vector representing the route to the destination location. If a degree of correspondence between the vectors is greater than or equal to a predetermined degree, the behavior determiner 115 determines that the vehicle 10 is heading for the destination location; or if less than the predetermined degree, determines that the vehicle 10 is not heading for the destination location.

Based on the behavioral history and the route (movement history) of the vehicle 10 from the departure location to the present location, the behavior predictor 116 predicts a "place to go" by the vehicle 10 (i.e., a destination location for the behavior as of a given time). The behavior predictor 116 takes the route of the vehicle 10 from the departure location to the present location (movement history) into account; associates the history of places, dates, and times included in the behavioral history with the route history of the visits; and applies a statistical process to the associated data for extracting highly frequent behaviors, so as to predict a place to go (destination location) of the moving vehicle 10.

If the route of the vehicle 10 from the departure location to the present location (movement history) is heading for the destination location, the behavior predictor 116 infers that the vehicle 10 is heading for the destination location that has been set in the beginning. Conversely, if the route of the vehicle 10 from the departure location to the present location (movement history) is not heading for the destination location, for example, if the route deviates from the direction toward the destination location during the course of travel from the departure location to the present location, the behavior predictor 116 predicts a new destination location based on the route of the vehicle 10 from the departure location to the present location (movement history) and the behavioral history. For example, places located beyond the present movement route at which the user has stopped by in the past are taken as candidates of the new destination location, and by applying a statistical process to the candidates, the behavior predictor 116 predicts the new destination location.

The arrival time estimator 117 estimates an arrival time at the destination location. The arrival time estimator 117 calculates an arrival time based on the multi-modal route search function, by using, for example, a route from the present location to the destination location predicted by the behavior predictor 116. When estimating the arrival time, in order to implement the multi-modal route search function, the arrival time estimator 117 uses map data in the map DB 133 and timetable data in the timetable DB 137.

Here, "multi-modal" means using multiple means of transportation, for example, changing from moving by vehicle to another means of transportation. The multi-modal route search function is a search function assuming multi-modal transportation, and searches for an optimal moving route, by using road traffic information and operational information.

Note that the behavioral history may include an average moving speed of the vehicle 10, to calculate an arrival time using the estimated average moving speed on the route.

The schedule changer 118 changes the schedule stored in the schedule DB 132 if the destination location or the arrival time is changed. The schedule changer 118 is an example of a first schedule changer and a second schedule changer. The destination location or the arrival time changed by the schedule changer 118 is registered in the schedule stored in the schedule DB 132. At this time, the changed destination location or arrival time may be registered by being written over the original destination location or arrival time before the change, or by being written in addition to the original destination location or arrival time before the change.

If a new destination location is predicted by the behavior predictor 116, the schedule changer 118 changes the destination location included in a schedule item to the new destination location. If a new destination location is predicted by the behavior predictor 116, the schedule changer 118 changes the destination location included in an ongoing schedule item to the new destination location predicted by the behavior predictor 116.

Also, if the arrival time estimator 117 predicts that the arrival time will be delayed even without change in the destination location, or if the behavior predictor 116 predicts a new destination location, the schedule changer 118 changes the arrival time included in the schedule item to an arrival time estimated by the arrival time estimator 117.

Also, if a schedule item is deleted, the schedule changer 118 changes (advances) the start times (departure times and the like) of the schedule items following the deleted schedule item. For example, if a schedule item of a meeting at an office is deleted, the departure time to leave the office and the arrival time at the house are advanced in the schedule item after the meeting, and the start times and the like of the subsequent schedule items are also advanced.

Also, after a departure time registered in a schedule has passed, if the delay estimator 125, which will be described later, determines that it is not possible to arrive at the destination location at the arrival time as registered in the schedule, the schedule changer 118 changes the arrival time by using traffic information obtained by the information obtainer 124. For example, suppose that according to the traffic information, a traffic jam due to an accident has occurred on the route to the destination location, and the delay estimator 125 has determined that it is not possible to arrive at the destination location at the arrival time as registered in the schedule. In this case, the schedule changer 118 changes the arrival time in consideration of a delay time caused by the traffic jam due to the accident.

Also, before a departure time registered in a schedule passes, if the delay estimator 125 determines that it is not possible to arrive at the destination location at the arrival time as registered in the schedule, the schedule changer 118 advances the departure time so as to arrive at the destination location at the arrival time as registered in the schedule, by using traffic information obtained by the information obtainer 124. For example, suppose that according to the traffic information, a traffic jam due to an accident has occurred on the route to the destination location, and the delay estimator 125 has determined that it is not possible to arrive at the destination location at the arrival time as registered in the schedule. In this case, taking the delay time by the traffic jam due to the accident into account, the schedule changer 118 advances the departure time to avoid the delay.

The surrounding information provider 119 extracts information of stores, facilities, and the like that are located in a surrounding area of a present position of the vehicle 10 from surrounding information stored in the surrounding information DB 135. The information extracted by the surrounding information provider 119 is transmitted to the vehicle-installed device 20 of the vehicle 10 via the notifier 120. The surrounding information is extracted regardless of the behavioral history of the user.

The information of stores, facilities, and the like is, for example, information representing types and names of gas stations, convenience stores, supermarkets, department stores, restaurants, banks, post offices, parking lots, parks, restrooms, stations, hotels, art galleries, museums and the like. The surrounding area around a present position of the vehicle 10 may be an area specified by a predetermined radius (e.g., 300 m) centering on the present position, or may be an area included within a predetermined distance (e.g., 500 m) in the moving direction along a road including the present position.

The notifier 120 transmits a notification of data from the schedule management apparatus 100 to the vehicle-installed device 20. The content of a notification will be described later using a flowchart. The notifier 120 is an example of a first notifier, a second notifier, and a third notifier.

The deletion determiner 121 determines whether one or more schedule items registered in the schedule DB 132 have been deleted by the user. Even when one schedule item has been deleted, the deletion determiner 121 determines that the schedule item has been deleted.

A schedule item may be deleted, for example, when the user activates the application for the schedule management apparatus 100 (scheduler) on the smartphone terminal 30, and deletes one of multiple schedule items registered in the schedule DB 132. In such a case, a command to delete one of the schedule items (one item specified by the user) is transmitted from the smartphone terminal 30 to the schedule management apparatus 100, and the schedule generator 112 deletes the corresponding schedule item in the schedule DB 132. In such a case, the deletion determiner 121 determines that the schedule item has been deleted. The same applies in the case of deleting multiple schedule items.

If the deletion determiner 121 has determined that a schedule item has been deleted, the free time interval determiner 122 determines whether there is a time interval (a free time interval) between a present time and the start time of the next schedule item following the deleted schedule item. Here, the free time interval determiner 122 determines that there is a free time interval if the start time of the next schedule item following the deleted schedule item has not passed. Note that the start time of the next schedule item is a start time of the next schedule item that is registered in the schedule.

Also, if there is a free time interval, the free time interval determiner 122 retrieves the destination location of the schedule item preceding (before in time) the deleted schedule item, and the destination location of the schedule item following (after in time) the deleted schedule item, to calculate the distance between the two destination locations.

The free time interval determiner 122 calculates a transit time between the two destination locations, based on the multi-modal route search function using the calculated distance.

Further, the free time interval determiner 122 determines whether the free time interval is sufficiently long. Specifically, the free time interval determiner 122 determines whether the free time interval is longer than or equal to a time adding a predetermined threshold time to the calculated transit time.

The threshold time is set to, for example, one hour. This is to determine whether a free time interval is long enough to cover adding a certain period of time (threshold time) to a transit time between two destination locations, if there is a free time interval. The threshold time may be set to an average time required for activities such as shopping, snacking, and light exercise doable at a destination location.

If the free time interval determiner 122 has determined that there is a sufficiently long free time interval, the recommendation provider 123 extracts information of stores, facilities, and the like fitting to a liking of the user that exist between a present position of the vehicle 10 and the destination location of the next schedule item following the deleted schedule item, from the recommendation information stored in the recommendation DB 136, based on the behavioral history. The information extracted by the recommendation provider 123 is transmitted to the vehicle-installed device 20 of the vehicle 10 via the notifier 120.

Here, a "liking" means hobbies and tastes of the user, which are not limited to foods, drinks, and smoking, but any hobbies and tastes for everything tangible and intangible that relates to personal matters of the user.

For example, if favorite places of the user include Shinto shrines and Buddhist temples, the information of stores, facilities, and the like fitting to the user's liking includes the names, addresses, and the like of such shrines and temples. Also, if one of the hobbies of the user is the movies, the information may include names of movie theaters, titles of movies currently being played, and addresses of the movie theaters. Note that if recommendation information is set to include movie theaters, the threshold time described above may be set to two or three hours.

Also, the information of stores, facilities, and the like fitting to a liking is not limited to what has been described above, and may include information that represents any likes and dislikes of the user (relating to meals, lodging facilities, bathing facilities, massage, and so on). Note that information to recommend may include such stores, facilities, and the like fitting to a liking that are located away from a route connecting a present location and a destination location within a predetermined distance. The predetermined distance may be set in advance, and the distance is set to, for example, 3 km.

The information obtainer 124 obtains traffic information including road traffic information and operational information.

The road traffic information may include various information items relating to real-time information of highways and ordinary roads, and in addition, traffic congestion predictions and traffic restrictions. The real-time information is, for example, information of traffic congestions in terms of locations where the traffic congestions have occurred, lengths of congested traffic, passage times (transit times) between two points, and the like.

The operational information includes operational information of trains, operational information of airplanes, operational information of vessels, and operational information of buses. The operational information of respective means of transportation includes whether the operation is on schedule as in timetables, and if behind the schedule, delay times and causes of the delays.

Also, the operational information includes operational times of means of transportation such as trains, airplanes, buses, and vessels (timetables, arrival and departure times [e.g., schedule times of departures, transits, arrivals, and the like]); destinations; types (e.g., special express, express, semi-express, rapid, rapid express, commuter special express, commuter rapid, commuter express, regional express, regional semi-express, regional rapid, local, etc.); and names and identification numbers of places used for getting on and off the means of transportation (e.g., platform numbers and gate numbers), for each of the means of transportation.

The information obtainer 124 updates traffic information, for example, every five minutes, which is downloaded from external systems of, for example, in Japan, the National Police Agency; VICS (Vehicle Information and Communication System, registered trademark); ATiS (Advanced Traffic Information Service, registered trademark); Japan Road Traffic Information Center (JARTIC, registered trademark); railroad companies; bus companies; and the like. Note that a database may be provided to accumulate downloaded traffic information.

The delay estimator 125 predicts whether arriving at the destination location will be delayed with respect to the scheduled arrival time, based on the traffic information obtained by the information obtainer 124. Since the traffic information obtained by the information obtainer 124 includes at least one of the road traffic information and the operational information, the delay estimator 125 uses the multi-modal route search function to predict whether arriving at the destination location will be delayed with respect to the scheduled arrival time.

The lifelog DB 131 is provided for accumulating information representing lifelogs. A lifelog is information that includes a behavioral history, a positional history, a movement history, and stop-by places. The behavioral history includes the positional history, the movement history, and the stop-by places; however, the lifelog includes the positional history, the movement history, and the stop-by places, separately from the behavioral history.

The behavioral history is generated by the behavioral history generator 114 and registered in the lifelog DB 131. The positional history is obtained by the position obtainer 113 and registered in the lifelog DB 131. The movement history is generated during a process of generating the behavioral history by the behavioral history generator 114, and registered in the lifelog DB 131. The stop-by places are generated during the process of generating the behavioral history by the behavioral history generator 114, and registered in the lifelog DB 131.

The schedule DB 132 is provided for registering schedule items generated by the schedule generator 112. The schedule DB 132 can have multiple schedule items registered; specifically, multiple destination locations and corresponding departure times and arrival times included in the multiple schedule items can be registered in time series. Also, each schedule item may be corrected by the schedule changer 118.

The application for the schedule management apparatus 100 (scheduler) is, for example, an electronic calendar having a format such as iCalendar (trademark), and a schedule item may include an event managed with an attribute such as "vevent" and an action item managed with an attribute such as "vtodo". Also, a free time interval in the calendar may be managed with an attribute such as "freebusy", for example. Therefore, a schedule item can be generated by, for example, allocating an event or an action item managed with an attribute such as "vevent" and "vtodo" to a free time interval managed with an attribute such as "freebusy".

The map DB 133 is provided for registering map data. The map data is data for drawing a map such as a route map for representing a transportation network, and includes road map data and railway map data.

The road map data is, for example, meshed map data having suitability for the scale (e.g., the first to third regional mesh data of the JIS standard in Japan, 100-m mesh data, etc.) and the like. More specifically, the road map data is, for example, image data for drawing a map in a raster format, a vector format, or the like. The railway map data is data for drawing a railway map representing a schematic view of railways.

The POI DB 134 is provided for registering POI information relevant to the map data. The POI information represents names, genres, and positions (latitudes and longitudes) of stores, facilities, and the like located along roads included in the map data.

More specifically, the POI information includes data of features displayed on the map (e.g., buildings including houses and stations, roads, railroads, bridges, tunnels, shore lines such as seashores and lakefronts, sea, rivers, lakes, ponds, swamps, parks, outdoor facilities, and in addition, administrative region boundaries, administrative districts, contour lines, city blocks, and the like); data of notes displayed on the map (e.g., place names, addresses, telephone numbers, names of facilities such as stores, parks, and stations, names including popular names of famous places, historic spots, rivers, lakes, bays, mountains, forests, and the like, names of roads, bridges, tunnels, and the like, railway names, point information, word of mouth information, and the like); and data of symbols displayed on the map (e.g., map symbols of mountains, historic sites, temples, shrines, schools, hospitals, factories, cemeteries, and the like; shop symbols of gas stations, convenience stores, supermarkets, restaurants, banks, post offices, and the like; symbols of road signals, entrances, exits, tollgates, facilities such as service areas (SA) and parking areas (PA), interchanges (IC) of toll roads; facility symbols of parking lots, stations, hotels, art galleries, museums, and the like).

The surrounding information DB 135 is provided for registering information of symbols displayed on the map, including at least types and names of gas stations, convenience stores, supermarkets, department stores, restaurants, banks, post offices, parking lots, parks, restrooms, stations, hotels, art galleries, museums, and the like (surrounding information).

The surrounding information DB 135 is a database used by the surrounding information provider 119 when extracting information of stores, facilities, and the like located in the surroundings of a present position of the vehicle 10.

The recommendation DB 136 is a database for registering information of stores, facilities, and the like fitting to a liking of the user (recommendation information). The recommendation information registered in the recommendation DB 136 is used by the recommendation provider 123 to extract recommendation information of stores, facilities, and the like fitting to a liking of the user, located between a present position of the vehicle 10 and a destination location.

The recommendation information registered (stored) in the recommendation DB 136 is information of stores, facilities, and the like fitting to a liking of the user. The information of stores, facilities, and the like fitting to a liking of the user is, for example, if favorite places of the user include Shinto shrines and Buddhist temples, the names, addresses, and the like of such shrines and temples. Also, if one of the hobbies of the user is the movies, the information may include names of movie theaters, titles of movies currently being played, and addresses of the movie theaters.

Also, the information of stores, facilities, and the like fitting to a liking is not limited to what has been described above, and may also include information that represents likes and dislikes of the user (relating to meals, lodging facilities, bathing facilities, massage, and the like).

For example, the information registered in the recommendation DB 136 may be divided into different databases for daytime activities and for evening (after-five) activities. The database for daytime activities may include, for example, stores suitable for taking breakfast before going to the office, breaks in transit, lunch, afternoon break, dinner, and the like, or facilities for business use such as gas stations, car washing lots, bookstores, stationery shops, and the like, as long as they fit in a liking of the user.

Also, the database for after five may include, for example, facilities for leisure activities such as movie theaters, sports clubs, yoga classes, golf courses, driving ranges, golf schools, tennis clubs, tennis schools, swimming pools, swimming schools, yacht harbors, and the like, as long as they fit to a liking of the user.

Also, recommendation information for another user having a common liking may be registered in the recommendation DB 136. Alternatively, the recommendation information for the user may be associated with recommendation information for another user having a common liking that is registered in a recommendation DB 136 of another schedule management apparatus 100 used by the other user. Using recommendation information for another user is effective especially when the user has just started using the service of the schedule management apparatus 100, and little recommendation information has been registered in the recommendation DB 136. For example, comments of the other user having a common liking may be registered after the other user has used a relevant store or facility, so that the surrounding information provider 119 can read the comments later with the recommendation information.

The timetable DB 137 is a database to store timetable data. The timetable data is information representing timetables of means of transportation, for example, trains, airplanes, buses, street cars, ropeways, monorails, cable cars, ships, and the like. In addition to the timetable data, the timetable DB 137 may store fare data. The fare data is fares of, for example, trains, airplanes, buses, street cars, ropeways, monorails, cable cars, ships, and the like.

Figure 9:
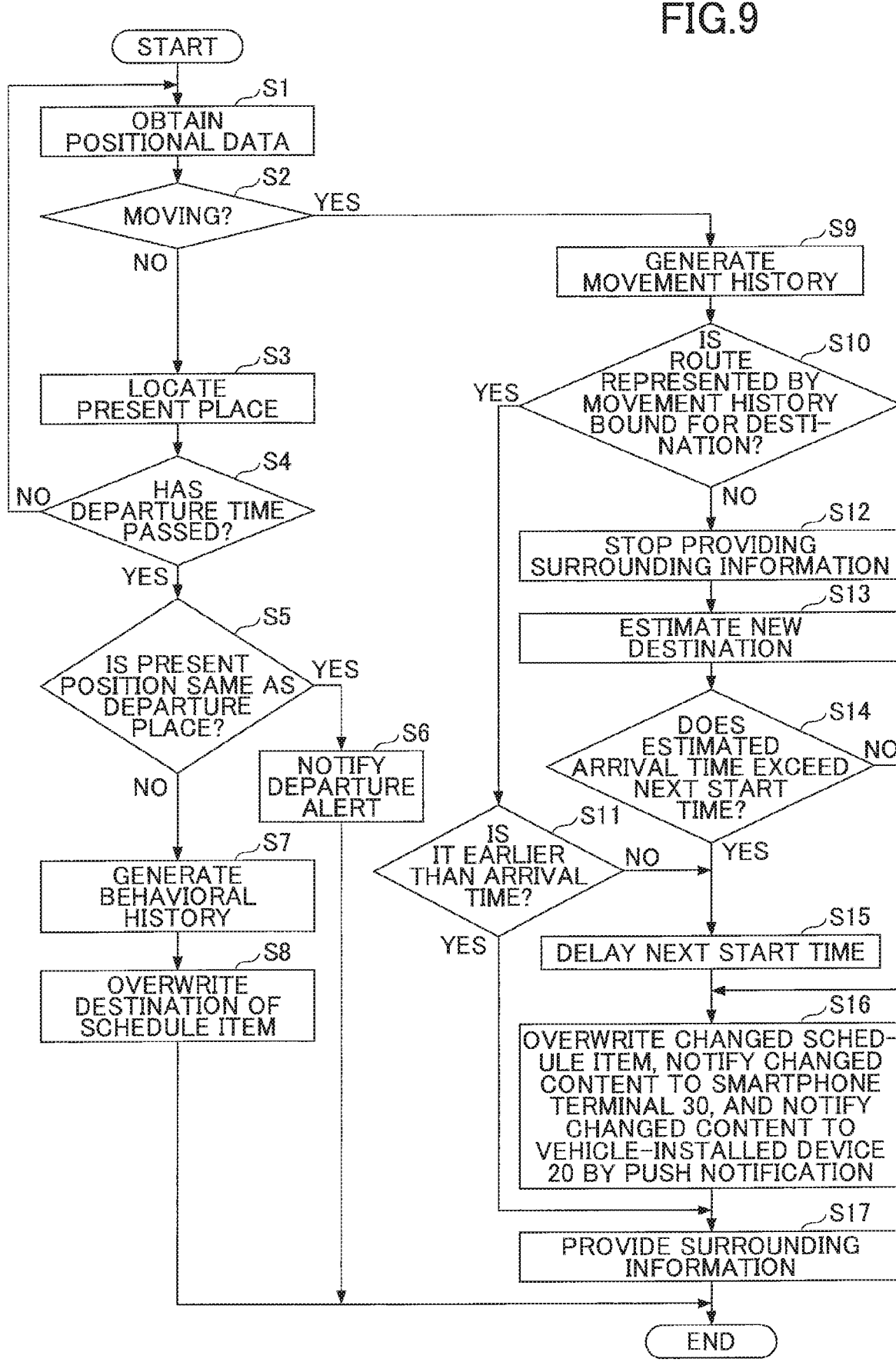
FIG. 9 is a flowchart illustrating a process of estimating a location of the user.

FIG. 9 is a flowchart illustrating a process of estimating a location of the user and predicting a destination location. The process represented by this flow is constantly repeated in the schedule management apparatus 100, one cycle of which will be described here.

Also, assume here that a schedule item including a departure time Ts1, a departure location Ps1, a destination location Pa1, and an arrival time Ta1 generated by the schedule generator 112 has been registered in the schedule DB 132, and the user is in the following situation: a situation where the departure time is approaching within a predetermined time (e.g., one hour); or a situation where the departure time (Ts1) has passed, and the user has not yet arrived at the destination location, namely, the schedule item is not completed.

A schedule item corresponding to such a situation will be referred to as an "ongoing schedule item", below.

Here, the schedule item generated by the schedule management apparatus 100 is transmitted from the notifier 120 of the schedule management apparatus 100 to the smartphone terminal 30 of the user, to be displayed on the display unit 33 of the smartphone terminal 30. As a use form of the schedule management apparatus 100 by the user, a form may be such that the user uses the vehicle-installed device 20 and the smartphone terminal 30 while traveling by the vehicle 10; and another form may be such that the user uses only the smartphone terminal 30 without using the vehicle 10.

In the former case, the schedule management apparatus 100 communicates with the vehicle-installed device 20 and the smartphone terminal 30; in the latter case, the schedule management apparatus 100 communicates only with the smartphone terminal 30. Also, in the former case, when the user turns on the ignition of the vehicle 10, the vehicle-installed device 20 starts communicating with the schedule management apparatus 100, and transmits a notification of an ID (Identification) specific to the user. Therefore, the schedule management apparatus 100 can distinguish which form is used among the former and the latter.

Note that although the former form will be described in the following, the description is virtually the same for the latter form.

First, once the process has started (START), the position obtainer 113 communicates with the vehicle-installed device 20, to obtain the positional data (Step S1). The position obtainer 113 stores the obtained positional data in the lifelog DB 131. As a result, the positional history of the vehicle 10 is accumulated in the lifelog DB 131.

The main controller 111 determines whether the vehicle 10 is moving (Step S2). The main controller 111 determines whether the vehicle 10 is moving, for example, by referring to the movement history for past 10 minutes. Having the main controller 111 refer to the movement history for the past 10 minutes is performed because the determination of whether the vehicle 10 is moving requires a certain period of time, as the vehicle 10 may stop for a while during a movement. Note that since it is simply necessary to refer to the movement history for a certain period of time, the period is not limited to past 10 minutes, but past 5 minutes, past 15 minutes, or past 30 minutes may be possible.

If having determined that the vehicle 10 is not moving (NO at Step S2), the main controller 111 identifies the present location of the vehicle 10 (Step S3). The present location is determined as follows. Among POIs registered in the POI DB 134, the main controller 111 extracts POIs close to the present position, which can be regarded as multiple candidates; identifies the most frequently visited stop-by place among stop-by places registered in the lifelog DB 131 as the present location (the present stop-by place); and registers the location in the lifelog DB 131 along with information representing the date and time. The frequency of visits to each stop-by place can be obtained by reading the number of times of registering the stop-by place.

The main controller 111 determines whether the departure time Td1 has passed (Step S4). The main controller 111 compares the present time with the departure time Td1 for the determination at Step S4.

The main controller 111 determines whether the present position obtained by the position obtainer 113 is the same as the departure location Ps1 (Step S5). This step is to determine whether the user has already left.

If having determined that the present position is the same as the departure location Ps1 (YES at Step S5), the main controller 111 transmits a notification of the departure alert (Step S6), and a series of steps are completed (END).

On the other hand, if the main controller 111 has determined that the present position is not the same as the departure location Ps1 (NO at Step S5), the behavioral history generator 114 generates the behavioral history (Step S7). The flow proceeds to Step S7 if the departure time Ts1 has passed, the vehicle 10 having moved from departure location Ps1 has arrived at some given site, and at least a certain period of time has passed as of the vehicle 10 being determined not moving at Step S2. This corresponds, for example, a case in which the user takes a rest at a location on the way to the destination location, or a case in which the user arrives at a location different from the destination location.

The positional history is accumulated in the lifelog DB 131 at Step S1, and the stop-by place is further accumulated in the lifelog DB 131 at Step S3. Therefore, the behavioral history generator 114 generates the behavioral history based on the positional history, the movement history, and the stop-by places. Repeating such a process further accumulates the behavioral history in the lifelog DB 131. A behavioral history item is added every time the user stops by a place after having left the departure location Ps1, and such items eventually form a record in which a route from the departure location to the final destination location is recorded.

The schedule changer 118 writes the destination location generated as the behavioral history item at Step S7 (arrived destination location) over the destination location registered in the schedule (Step S8). Step S8 overwrites a part of the schedule item registered in the schedule DB 132.

Completing Step S8 terminates a series of steps (END).

If it has been determined at Step S2 that the vehicle 10 is moving (YES at Step S2), the behavioral history generator 114 generates the movement history from the departure location to the present location obtained for the current process, by using the map data stored in the map DB 133 (Step S9).

The movement history represents a route of a movement, which is obtained by applying map matching to a history of the latitudes and longitudes represented in the positional history, and associating the history with roads in map data. By applying map matching to the movement route from the departure location to the present location of the vehicle 10 to be associated with roads in map data, the movement history (route) from the departure location to the present location for the current process can be obtained.

In this way, after the positional history has been accumulated in the lifelog DB 131 at Step S1, and the vehicle 10 has been determined moving at Step S2, the movement history is generated. In this way, the movement history is accumulated in the lifelog DB 131.

The behavior determiner 115 determines whether the route of the movement represented by the movement history generated at Step S9 is the route heading for the destination location of the ongoing schedule item (Step S10). Step S10 is to determine whether a degree of correspondence between a vector of the route of the movement obtained at Step S9 and a vector of the route heading for the destination location of the ongoing schedule item is greater than or equal to a predetermined degree. If the degree of correspondence between the vectors is greater than or equal to the predetermined degree, the behavior determiner 115 determines that the vehicle 10 is heading for the destination location; or if less than the predetermined degree, determines that the vehicle 10 is not heading for the destination location.

If the degree of correspondence between the vectors is greater than or equal to the predetermined degree, the vehicle 10 is heading for the destination location of the ongoing schedule item; or if the correspondence is less than the predetermined degree, the vehicle 10 is not heading for the destination location of the ongoing schedule item.

Note that the destination location of an ongoing schedule item may be changed depending on a behavior of the user. Therefore, if the destination location has not been changed from the beginning, the destination location of the ongoing schedule item is Pa1; or if changed from the beginning, the destination location of the ongoing schedule item is not Pa1, but a location predicted by the schedule management apparatus 100 to which the vehicle 10 is headed.

If the route of the movement has been determined to be the route heading for the destination location (YES at Step S10), the main controller 111 determines whether the present time is before the arrival time of the ongoing schedule item (Step S11). Step S11 executed by the main controller 111 is to determine whether the present time is before the arrival time of the ongoing schedule item.

If the main controller 111 has determined that the route of the movement is not the route heading for the destination location (NO at Step S10), the surrounding information provider 119 stops providing the surrounding information registered in the surrounding information DB 135 (Step S12). Note that once a process according to the flow illustrated in FIG. 9 has started, the surrounding information provider 119 begins providing the surrounding information automatically. The vehicle-installed device 20 is provided with the surrounding information when the surrounding information provider 119 causes the notifier 120 to issue a notification to the vehicle-installed device 20.

The behavior predictor 116 predicts a place to go by the vehicle 10, based on the behavioral history registered in the lifelog DB 131 and the movement history (route of the movement) generated at Step S9 (Step S13). The behavior predictor 116 predicts the place to go (destination location) by the vehicle 10 in consideration of the route (movement history) of the vehicle 10 from the departure location to the present location, by applying a statistical process to the route and the history of places visited by the user along with the dates and times, which are included in the behavioral history.

Also, based on the multi-modal route search function, the arrival time estimator 117 predicts a route to the destination location, and calculates (estimates) an arrival time. This process executed by the arrival time estimator 117 is also a part of Step S13.

The main controller 111 determines whether the arrival time estimated by the arrival time estimator 117 is past the start time of the following schedule item (Step S14). This is to determine whether it is necessary to change the start time of the following schedule item if it is inferred that the user has changed the destination location.

The schedule changer 118 delays the start time of the following schedule item if it has been determined NO at Step S11 that the present time is not before the arrival time of the ongoing schedule item, or if it has been determined YES at Step S14 that the estimated arrival time is past the start time of the following schedule item (Step S15). The delayed start time is registered in the schedule DB 132 (by writing over the start time before the change).

Next, the schedule changer 118 registers the changed schedule item into the schedule DB 132 (overwriting), causes the notifier 120 to issue a notification of the changed contents of the schedule item to the smartphone terminal 30, and to further issue a notification of the changed contents to the vehicle-installed device 20 by push notification (Step S16).

Also, if the process has proceeded to Step S16 via Step S15 (if the arrival time will be delayed), the main controller 111 causes the display unit 23 of the vehicle-installed device 20 to display a message 23A (see FIG. 7A) inquiring whether to transmit an e-mail to an e-mail address registered as a contact address in case the arrival time will be delayed. If the user reacts to the inquiry by pressing the button for issuing a command to transmit an e-mail, the vehicle-installed device 20 transmits the e-mail. Note that such an e-mail may be transmitted automatically, without waiting for a direction made by the user.

The changed content is the new arrival time if the process has proceeded to Step S16 through Steps S10, S11, and S15; or the new arrival time and destination location if the process has proceeded to Step S16 through Steps S10, S12, S13, S14, and S15.

Therefore, at Step S16, the new arrival time or the new arrival time and the destination location are registered (overwritten) in the schedule DB 132.

Also, the scheduler of the smartphone terminal 30 writes the changed contents (the new arrival time or the new arrival time and destination location) in addition to the contents before the change.

Further, the changed contents (the new arrival time or the new arrival time and destination location) are displayed on the display unit 23 of the vehicle-installed device 20 by push notification.

Next, the surrounding information provider 119 provides the surrounding information registered in the surrounding information DB 135 (Step S17). The surrounding information provider 119 retrieves surrounding information depending on the present location from the surrounding information DB 135, and causes the notifier 120 to transmit a notification to the vehicle-installed device 20.

Thus, a series of steps are completed (END).

Note that if the arrival time estimated at Step S13 is determined to be past the start time of the following schedule item (YES at Step S14), at Step S15, the notifier 120 may transmit a push notification for confirming with the user whether to delay the start time of the following schedule item, to the vehicle-installed device 20. If the user accepts delaying the start time, the process proceeds to Step S16; or if the user does not accept, the process proceeds to Step S17.

Note that at Step 11, if a determination has been made that the present time is before the arrival time of the ongoing schedule item (YES at Step S11), the flow proceeds to Step S17 and the surrounding information provider 119 provides the surrounding information registered in the surrounding information DB 135 (Step S17).

Also, if a determination has been made at Step S14 that the estimated arrival time is not past the start time of the following schedule item (NO at Step S14), the changed content in the schedule item is only the destination location. Therefore, if the determination at Step S14 was NO, the process proceeds to Step S16, and the schedule changer 118 causes the notifier 120 to issue a notification of the changed new destination location to the smartphone terminal 30, and to issue a push notification to the vehicle-installed device 20 (Step S16).

As described above, the process according to this flow is executed repeatedly to predict the destination location of the user.

Figure 10:
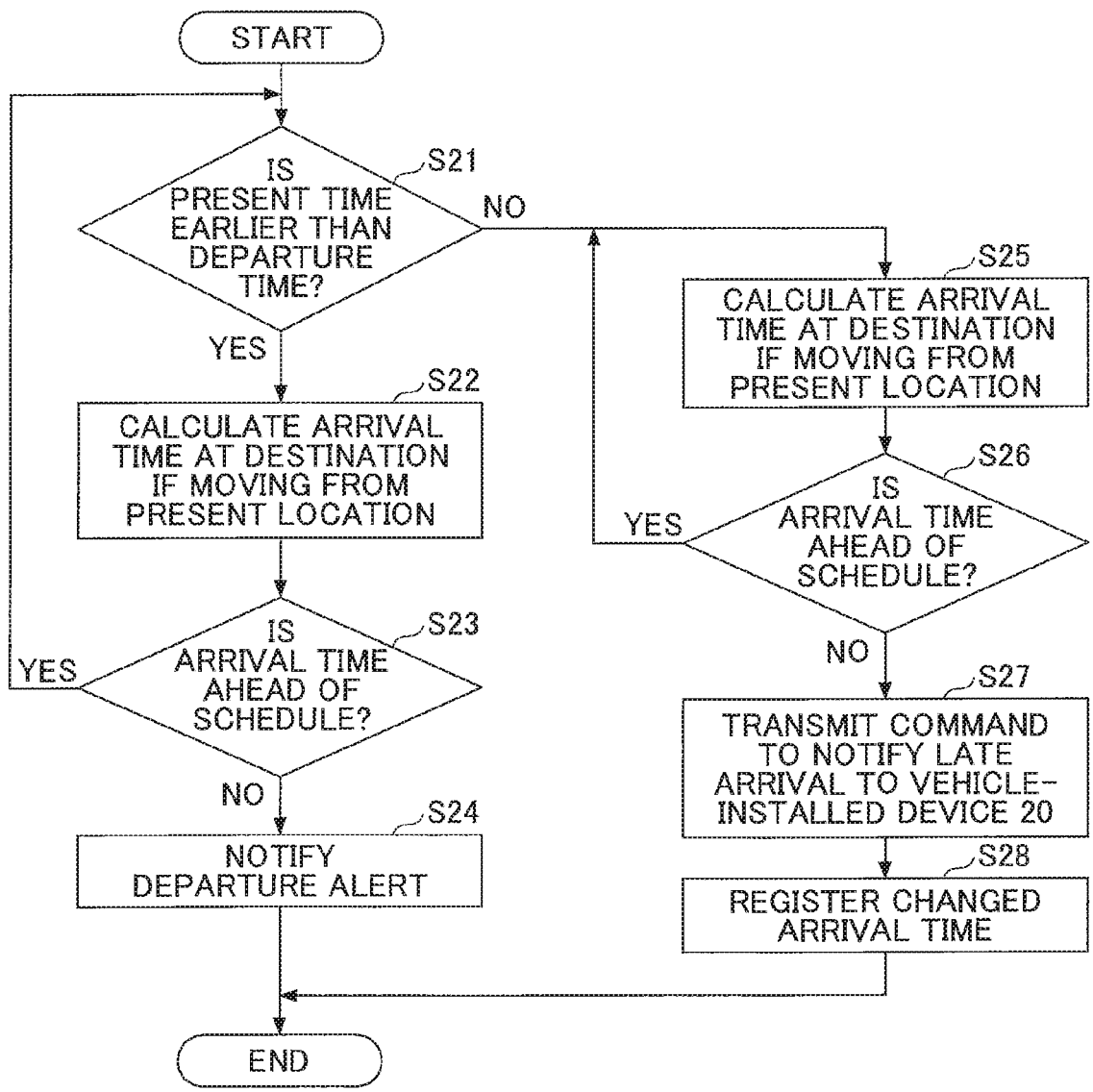
FIG. 10 is a flowchart illustrating a process of estimating an arrival time at a destination location.

FIG. 10 is a flowchart illustrating a process of estimating an arrival time at the destination location. The process represented by this flow is constantly repeated in the schedule management apparatus 100, one cycle of which will be described here. Also, the process of estimating the arrival time illustrated in FIG. 10 is executed at the same time as the process of predicting the place of the user illustrated in FIG. 9 is executed. For example, Step S13 to calculate (estimate) an arrival time in FIG. 9 is executed by the arrival time estimator 117 following the flow illustrated in FIG. 10.

Also, assume that a schedule item here is the ongoing schedule item that includes the departure time Ts1, the departure location Ps1, the destination location Pa1, and the arrival time Ta1.

The main controller 111 determines whether the present time is before the departure time Td1 (Step S21). The main controller 111 compares the present time with the departure time Td1 for the determination at Step S21.

If a determination has been made that the present time is before the departure time Td1 (YES at Step S21), the arrival time estimator 117 predicts a route from the present location to the destination location based on the multi-modal route search function, and calculates (estimates) an arrival time at the destination location when moving from the present location (Step S22). As the destination location, the destination location included in the ongoing schedule item registered in the schedule DB 132 may be used.

The main controller 111 determines whether the arrival time estimated at Step 22 is ahead of the arrival time registered in the ongoing schedule item (Step S23). Here, "the arrival time estimated at Step 22 is ahead of the arrival time registered in the ongoing schedule item" means that arriving at the destination will not be delayed with respect to the arrival time registered in the ongoing schedule item.

If having determined that the estimated arrival time is ahead of the arrival time registered in the ongoing schedule item (YES at Step S23), the main controller 111 returns to Step S21 in the flow. This is performed in order to repeat Step S21 so that no delay will occur with respect to the arrival time.

If having determined that the estimated arrival time is not ahead of the arrival time registered in the ongoing schedule item (NO at Step S23), the main controller 111 transmits a notification of the departure alert (Step S24). The departure alert is a process to issue a notification to the smartphone terminal 30 of the user by push notification to advance the departure time if a delay is expected. The main controller 111 transmits such a notification indicating the necessity of the departure alert to the schedule changer 118, the schedule changer 118 calculates an advanced departure time to avoid the expected delay, and causes the notifier 120 to issue a push notification of the advanced departure time to the smartphone terminal 30.

Thus, a series of steps are completed (END).

If a determination has been made that the present time is not before the departure time Td1 (NO at Step S21), the arrival time estimator 117 predicts a route from the present location to the destination location based on the multi-modal route search function, and calculates (estimates) an arrival time at the destination location if moving from the present location (Step S25). As the destination location, the destination location included in the ongoing schedule item registered in the schedule DB 132 may be used.

The main controller 111 determines whether the arrival time estimated at Step 25 is ahead of the arrival time registered in the ongoing schedule item (Step S26). As in Step 23, "the arrival time estimated at Step 25 is ahead of the arrival time registered in the ongoing schedule item" means that arriving at the destination will not be delayed with respect to the arrival time registered in the ongoing schedule item.

If having determined that the arrival time estimated at Step 25 is ahead of the arrival time registered in the ongoing schedule item (YES at Step S26), the main controller 111 returns to Step S25 in the flow. This is performed in order to repeat Step S25 so that no delay will occur with respect to the arrival time.

If having determined that the arrival time estimated at Step 25 is not ahead of the arrival time registered in the ongoing schedule item (NO at Step S26), the main controller 111 transmits a command to issue a notification of a late arrival to the vehicle-installed device 20 so that persons concerned are informed that the arrival time will be delayed (Step S27). In response to receiving the command, the communication unit 22 of the vehicle-installed device 20 transmits a notification of the late arrival, for notification to the persons concerned. Accordingly, as illustrated in FIG. 7A, a message 23A by push notification is displayed on the display unit 23 of the vehicle-installed device 20.

The schedule changer 118 registers the changed arrival time in the schedule DB 132 (Step S28). Thus, the arrival time included in the ongoing schedule item is changed to the arrival time estimated at Step S25 (an arrival time later than the arrival time before the change).

Thus, a series of steps are completed (END).

Figure 11:
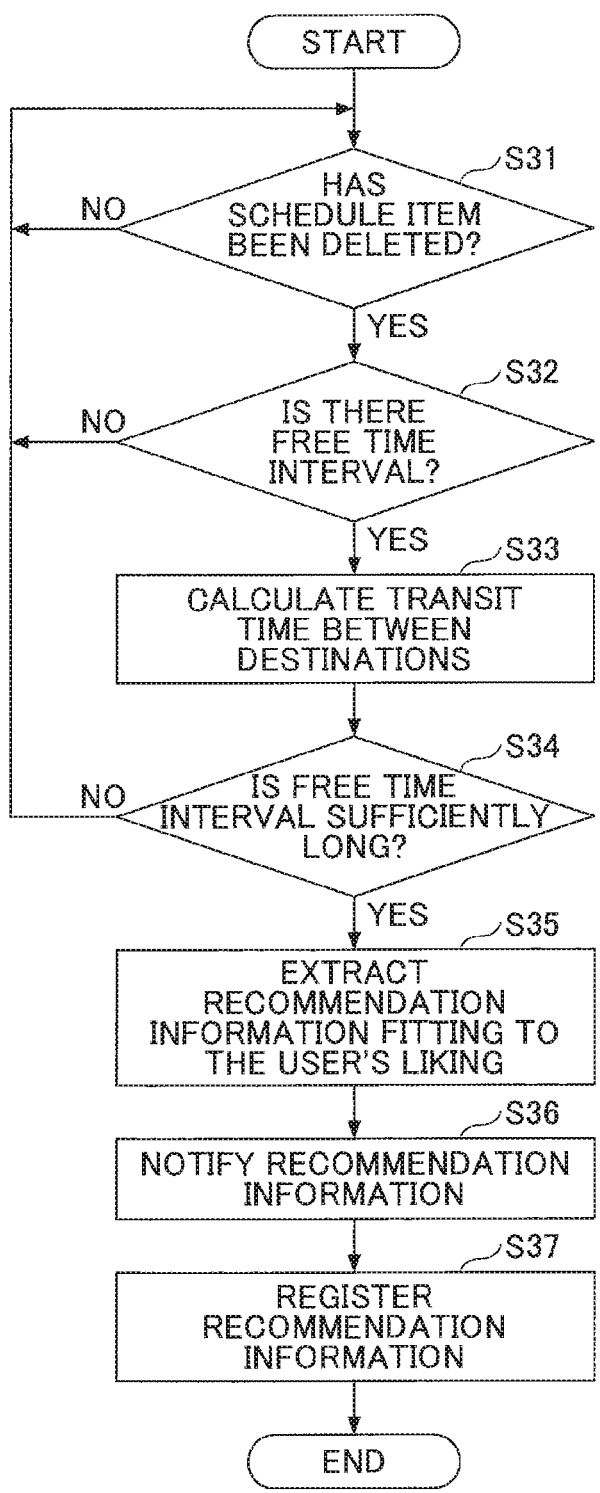
FIG. 11 is a flowchart illustrating a process of providing a user with recommendation information.

FIG. 11 is a flowchart illustrating a process of providing the user with recommendation information. A process according to this flow is executed in parallel with a process according to the flow illustrated in FIG. 9 if a schedule item is deleted. Also, if estimating an arrival time at Step S35, which will be described below, the arrival time estimator 117 executes a process according to the flow illustrated in FIG. 10.

The deletion determiner 121 determines whether a schedule item has been deleted (Step S31). A case where the schedule item has been deleted is a case where one or more schedule items that are registered in the schedule DB 132 has been deleted by the user.

If having determined that a schedule item has not been deleted (NO at Step S31), the deletion determiner 121 repeats Step S31.

If the deletion determiner 121 has determined that a schedule item has been deleted (YES at Step S31), the free time interval determiner 122 determines whether there is a time (a free time interval) between the present time and the start time of the next schedule item following the deleted schedule item (Step S32).

The free time interval determiner 122 determines that there is a time (a free time interval) if the start time of the next schedule item following the deleted schedule item has not passed; or if passed, determines that there is no free time interval.

If having determined that there is a free time interval (YES at Step S32), the free time interval determiner 122 retrieves the destination location of the schedule item preceding the deleted schedule item, and the destination location of the next schedule item following the deleted schedule item, and calculates a transit time between the two destination locations (Step S33).

The free time interval determiner 122 calculates a transit time between the two destination locations, based on the multi-modal route search function using the distance between the two destination locations.

Next, the free time interval determiner 122 determines whether the free time interval is sufficiently long (Step S34). A sufficiently long free time interval is a time adding a predetermined threshold time to the calculated transit time, where the threshold time is, for example, one hour.

If the free time interval determiner 122 has determined that there is a sufficiently long free time interval (YES at Step S34), the recommendation provider 123 extracts recommendation information of stores, facilities, and the like fitting to a liking of the user that are located between the present position of the vehicle 10 and the destination location of the next schedule item following the deleted schedule item, from the recommendation information stored in the recommendation DB 136, based on the behavioral history (Step S35). More specifically, the recommendation provider 123 extracts such recommendation information of stores, facilities, and the like fitting to a liking of the user from the recommendation information based on the behavioral history, by extracting stores and facilities in categories of stores and facilities often used by the user at which the user has stayed on average for less than the free time interval, and further, extracting among those stores and facilities at which the user might potentially stop for less than the free time interval, stores and facilities highly frequently used by the user, based on use counts in the past, and taking the positions and business hours of the stores and facilities into account. The arrival time estimator 117 also calculates (estimates) arrival times at the stores, facilities, and the like presented as the recommendation information.

The recommendation provider 123 causes the notifier 120 to issue a notification of the recommendation information extracted at Step S35 along with the estimated arrival times to the vehicle-installed device 20 and the smartphone terminal 30 (Step S36). At this time, the recommendation information is displayed on the display unit 23 of the vehicle-installed device 20 by push notification, and the recommendation information is displayed on the scheduler of the smartphone terminal 30.

If an item of the recommendation information notified at Step S36 is accepted by the user (OK [selected] for incorporation into the schedule), the main controller 111 registers the recommendation information item in the schedule DB 132 (Step S37).

Thus, a series of steps are completed (END).

As described above, if a schedule item is deleted, in order to automatically propose a new schedule item, recommendation information is extracted to be proposed to the user.

As above, according to the embodiment, the schedule management apparatus 100 obtains a behavioral history of the user, predicts a behavior of the user, based on the behavioral history, and changes a destination location and an arrival time included in a schedule item. The changed content of the schedule item is notified to the smartphone terminal 30.

Therefore, according to the embodiment, it is possible to provide an apparatus such as the schedule management apparatus 100 that can change a schedule automatically based on a behavioral history of a user.

In other words, according to the embodiment, it is possible to provide an apparatus such as the schedule management apparatus 100 that can estimate a destination location and an arrival time appropriately in any cases.

Also, if a destination location and an arrival time included in a schedule item are changed, the changed contents are notified to the vehicle-installed device 20 by push notification. Therefore, even in a situation where the user is driving the vehicle 10 and cannot watch the smartphone terminal 30, the changed contents can be transferred via the vehicle-installed device 20.

Also, if an arrival time will be delayed, an e-mail is transmitted to persons concerned. Therefore, it is possible to securely contact the persons concerned even if the user is driving the vehicle 10.

Also, if a schedule item is deleted and there is a free time interval until the following schedule item starts, based on the behavioral history of the user, it is possible to provide recommendation information of stores, facilities, and the like fitting to a liking of the user to the smartphone terminal 30.

Therefore, according to the embodiment, it is possible to provide an apparatus such as the schedule management apparatus 100 that can propose a stop-by place according to a liking of a user, by using the behavioral history.

Note that although the above embodiments have been described in which a user on board the vehicle 10 uses the vehicle-installed device 20 and the smartphone terminal 30, the user is not required to use the vehicle 10 and may use only the smartphone terminal 30.

In such a case, the position obtainer 113 may communicate with the smartphone terminal 30, to obtain the positional data. The positional data is obtained by a GPS function installed in the smartphone terminal 30. Also, the information notified from the schedule management apparatus 100 to the vehicle-installed device 20 in the above description may be notified to the smartphone terminal 30.

As above, a schedule management apparatus has been described according to exemplary embodiments in the present disclosure. Note that various modifications and changes can be made for the embodiments specifically disclosed as above, without deviating from the subject matters described in the claims.

The invention claimed is:

1. A schedule management apparatus to manage a schedule of a user that includes a schedule item including a departure location of a behavior of the user, a departure time at which the user leaves the departure location, a destination location of the behavior, and an arrival time at which the user arrives at the destination location, the schedule management apparatus comprising:
 a central processing unit and a memory unit coupled to the central processing unit, the memory unit stores a program that, when executed by the central processing unit, causes the central processing unit to:
 obtain, by a position obtainer via wireless transmission from a vehicle-installed device of a vehicle, a position of the user traveling by the vehicle;
 generate, by a behavioral history generator, a behavioral history representing a history of the behaviors of the user, based on a history of the positions of the user up to a present time obtained by the position obtainer, a movement history representing a history of movements of the user obtained based on the history of the positions, and a history of places visited by the user obtained based on the movement history, the history of the positions of the user, the movement history, and the history of places visited by the user are registered in a lifelog database, the lifelog database is stored in the memory unit;
 issue, by a first notifier, a notification of the schedule item including the departure time, the departure location, the destination location, and the arrival time, to a terminal of the user, the notification issued by the first notifier is displayed on a display of the terminal of the user;
 determine, by a behavior determiner, whether the user is heading for the destination location after the departure time has passed, based on the movement history starting from the departure location of the user;
 cause, by a main controller, a display unit of the vehicle-installed device to display a message inquiring whether to transmit an e-mail to an e-mail address registered as a contact address in a case where the arrival time will be delayed, wherein the vehicle-installed device transmits the e-mail if a button for issuing a command to transmit the e-mail is pressed, the button for issuing the command being displayed by the display unit of the vehicle-installed device:
 predict, by a behavior predictor, a new destination location, based on the movement history starting from the departure location and the behavioral history, in a case where the behavior determiner has determined that the user is not heading for the destination location;
 estimate, by an arrival time estimator, an arrival time at the new destination location in a case where the new destination location has been predicted;
 change, by a first schedule changer, the destination location and the arrival time included in the schedule item to the new destination location and the arrival time at the new destination location, respectively, in the case where the new destination location has been predicted;
 issue, by a second notifier, a notification of the schedule item changed by the first schedule changer including the new destination location and the arrival time at the new destination location, to the terminal of the user, the notification to the terminal of the user issued by the second notifier being displayed on the display of the terminal of the user; and
 issue, by the second notifier via wireless transmission to the vehicle-installed device of the vehicle by which the user is traveling, a notification of the schedule item changed by the first schedule changer including the new destination location and the arrival time at the new destination location, the notification to the vehicle-installed device by the second notifier being displayed on a display unit of the vehicle-installed device.

2. The schedule management apparatus as claimed in claim 1, wherein the central processing unit is further configured to:
 generate, by a schedule generator, the schedule item including the departure time, the departure location, the destination location, and the arrival time, based on the behavioral history.

3. The schedule management apparatus as claimed in claim 1, wherein the central processing unit is further configured to:

determine, by a deletion determiner, whether the schedule item including the destination location and the arrival time, or the schedule item including the new destination location and the arrival time at the new destination location, has been deleted;

determine, by a free time interval determiner, whether there is a free time interval in the schedule of the user after the arrival time or the arrival time at the new destination location, in a case where the deletion determiner has determined that the schedule item has been deleted;

register, in a recommendation information database, recommendation information of a store or a facility fitting to a liking of the user;

extract, by a recommendation provider, the recommendation information to be recommended to the user from the recommendation information database, based on the behavioral history, in a case where the free time interval determiner has determined that there is the free time interval; and issue, by a third notifier, a notification of the recommendation information presenting the store or the facility, to the terminal of the user, the notification issued by the third notifier is displayed on the display of the terminal of the user.

4. The schedule management apparatus as claimed in claim 3, wherein the arrival time estimator estimates the arrival time at the store or the facility presented in the recommendation information, in the case where the recommendation information has been extracted, wherein the third notifier issues the notification of the recommendation information presenting the store or the facility, additionally presenting the arrival time at the store or the facility, to the terminal of the user.

5. The schedule management apparatus as claimed in claim 4, wherein the third notifier issues the notification of the recommendation information presenting the store or facility and the arrival time at the store or the facility, to the terminal of the user, by a push notification.

6. The schedule management apparatus as claimed in claim 1, wherein the central processing unit is further configured to:

obtain, by an information obtainer, traffic information including at least one of road traffic information and operational information;

predict, by a delay estimator, whether arriving at the destination location will be delayed with respect to the arrival time, based on the traffic information obtained by the information obtainer;

advance, by a second schedule changer, the departure time, in a case where the delay estimator has predicted before the departure time has passed that arriving at the destination location would be delayed with respect to the arrival time, so as to avoid the delay with respect to arriving at the destination location, or to delay the arrival time by an amount of the delay in a case where the delay estimator has predicted, after the departure time has passed, that arriving at the destination location would be delayed with respect to the arrival time.

7. The schedule management apparatus as claimed in claim 6, wherein the first notifier issues a notification of the advanced departure time to the terminal of the user by a push notification.

* * * * *

UNITED STATES PATENT AND TRADEMARK OFFICE
CERTIFICATE OF CORRECTION

PATENT NO. : 10,860,986 B2  
APPLICATION NO. : 15/646474  
DATED : December 8, 2020  
INVENTOR(S) : Koichi Suzuki Page 1 of 1

It is certified that error appears in the above-identified patent and that said Letters Patent is hereby corrected as shown below:

On the Title Page

Item (71), applicant, city, delete "Toyota" and insert --Toyota-shi Aichi-ken--, therefor.

Item (72), inventor 1, city, delete "Miyoshi" and insert --Miyoshi-shi Aichi-ken--, therefor.

Item (73), assignee, city, delete "Toyota" and insert --Toyota-shi Aichi-ken--, therefor.

Signed and Sealed this  
Thirtieth Day of March, 2021

Drew Hirshfeld  
*Performing the Functions and Duties of the*  
*Under Secretary of Commerce for Intellectual Property and*  
*Director of the United States Patent and Trademark Office*